(12) United States Patent
Ni

(10) Patent No.: US 10,742,502 B2
(45) Date of Patent: Aug. 11, 2020

(54) SOFTWARE MODIFICATION INITIATION METHOD, AND METADATA RELEASE METHOD AND APPARATUS

(71) Applicant: HUAWEI TECHNOLOGIES CO., LTD., Shenzhen (CN)

(72) Inventor: Shaoji Ni, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/388,852

(22) Filed: Apr. 18, 2019

(65) Prior Publication Data

US 2019/0245741 A1 Aug. 8, 2019

Related U.S. Application Data

(63) Continuation of application No. PCT/CN2017/093415, filed on Jul. 18, 2017.

(30) Foreign Application Priority Data

Oct. 18, 2016 (CN) .......................... 2016 1 0908967
Jan. 26, 2017 (CN) .......................... 2017 1 0057662

(51) Int. Cl.
 *H04L 12/24* (2006.01)
 *G06F 9/455* (2018.01)
 *G06F 8/65* (2018.01)

(52) U.S. Cl.
 CPC ............. *H04L 41/082* (2013.01); *G06F 8/65* (2013.01); *G06F 9/45558* (2013.01); *G06F 2009/45595* (2013.01)

(58) Field of Classification Search
 CPC . H04L 41/082; H04L 41/044; G06F 9/45558; G06F 8/65; G06F 2009/45595; G06F 8/71
 See application file for complete search history.

(56) References Cited

U.S. PATENT DOCUMENTS

2003/0200295 A1 10/2003 Roberts et al.
2016/0205004 A1 7/2016 Chou et al.
(Continued)

FOREIGN PATENT DOCUMENTS

CN 1659539 A 8/2005
CN 104253866 A 12/2014
(Continued)

OTHER PUBLICATIONS

ETSI GS NFV-MAN 001 V1.1.1 (Dec. 2014), Network Functions Virtualisation (NFV); Management and Orchestration, Dec. 2014. total 184 pages.
(Continued)

*Primary Examiner* — Michael A Keller
(74) *Attorney, Agent, or Firm* — Kilpatrick Townsend & Stockton LLP

(57) ABSTRACT

Embodiments provide a software modification initiation method. The method can include receiving, by a VNFM, a VNF LCM request sent by an NFVO. The VNF LCM request may include an instance identifier of a VNF instance of to-be-modified first-version VNF software. The method can include determining, by the VNFM, that a type of the VNF LCM request indicates a software modification operation, and obtaining metadata according to the VNF LCM request. The metadata may include a version identifier of the first-version VNF software and a software modification type. The method can include determining, by the VNFM, a first VNF instance of the first-version VNF software based on the instance identifier of the VNF instance of the to-be-modified first-version VNF software. The method can also include initiating, by the VNFM, a software modification operation for the first VNF instance of the first-version VNF software based on the software modification type.

20 Claims, 15 Drawing Sheets

(56) References Cited

U.S. PATENT DOCUMENTS

2016/0337172 A1 11/2016 Yu et al.
2017/0104609 A1* 4/2017 McNamee ............ H04M 15/61
2019/0266012 A1* 8/2019 Chou ...................... G06F 9/455

FOREIGN PATENT DOCUMENTS

| CN | 105577409 A | 5/2016 |
| WO | 2015113278 A1 | 8/2015 |
| WO | WO-2017121153 A1 * | 7/2017 |

OTHER PUBLICATIONS

ETSI GS NFV 002 V1.2.1 (Dec. 2014), Network Functions Virtualisation (NFV); Architectural Framework, Dec. 2014. total 21 pages.
Huawei Technologies (UK) et al: Missed consistency clarifications for B.5 and C. 5;ETSI Draft; Aug. 1, 2014, pp. 1-45, XP14228848.

* cited by examiner

SOFTWARE MODIFICATION INITIATION METHOD, AND METADATA RELEASE METHOD AND APPARATUS

CROSS-REFERENCE TO RELATED APPLICATIONS

This application is a continuation of International Application No. PCT/CN2017/093415, filed on Jul. 18, 2017, which claims priority to Chinese Patent Application No. 201710057662.6, filed on Jan. 26, 2017, and Chinese Patent Application No. 201610908967.9, filed on Oct. 18, 2016. All of the aforementioned patent applications are hereby incorporated by reference in their entireties.

TECHNICAL FIELD

This application relates to the field of software technologies, and in particular, to a software modification initiation method and a metadata release method and apparatus.

BACKGROUND

For a conventional system, an update and an upgrade of network function (NF) software are controlled and managed by a network function management, operation, and maintenance system (such as an element manager (EM)). For a network functions virtualization (NFV) system, two management, operation, and maintenance systems need to be connected for network service operation, maintenance, and management. One is a conventional service layer management system, such as an operation support system (OSS), a business support system (BSS), or an element manager (EM). The other is a virtual resource management and orchestration system, such as a management and orchestration (MANO) system in the NFV system.

A current NFV standard does not define an operation used to update or upgrade virtualization network function (VNF) software. In addition, a conventional method used to update or upgrade network function software is applicable only to a system including a single management, operation, and maintenance system, and cannot be directly used to update or upgrade VNF software in an NFV system. Therefore, how to update and modify VNF software in an NFV system is a problem that urgently needs to be resolved in the art.

SUMMARY

This application provides a software modification initiation method and a metadata release method and apparatus, to implement automatic modification operations for VNF software in an NFV system.

According to a first aspect, an embodiment of the present invention provides a software modification initiation method, where the method is applied to a network functions virtualization NFV system, the NFV system includes a virtualized network function manager VNFM, and the method includes:

receiving, by the VNFM, a virtualized network function VNF lifecycle management LCM request, where the VNF LCM request includes an instance identifier of a VNF instance of to-be-modified first-version VNF software;

determining, by the VNFM, that a type of the VNF LCM request is a software modification operation, and obtaining metadata according to the VNF LCM request, where the metadata includes a version identifier of the first-version VNF software and a software modification type;

determining, by the VNFM, a first VNF instance of the first-version VNF software based on the version identifier of the first-version VNF software and the instance identifier of the VNF instance of the first-version VNF software; and initiating, by the VNFM, a software modification operation for the first VNF instance of the first-version VNF software based on the software modification type.

It can be learned from the foregoing that, in the software modification initiation method provided in this embodiment of the present invention, the VNFM first determines, according to the VNF LCM request in the NFV system, to perform the software modification operation; then obtains the metadata according to the VNF LCM request; then determines the first VNF instance of the to-be-modified first-version VNF software based on the version identifier in the metadata and the instance identifier in the VNF LCM; and finally initiates the software modification operation for the first VNF instance of the to-be-modified first-version VNF software based on the software modification type in the metadata. It can be learned that the process of initiating the software modification operation for the first VNF instance of the first-version VNF software is sequentially executed by the VNFM, and no user participation is required. This implements automatic modification operations for VNF software in the NFV system.

In a possible design, the NFV system includes a network functions virtualization orchestrator NFVO, and the receiving, by the VNFM, a virtualized network function VNF lifecycle management LCM request includes:

receiving, by the VNFM, the virtualized network function VNF lifecycle management LCM request sent by the NFVO.

In a possible design, the NFV system runs the first VNF instance, the first VNF instance is obtained by the NFV system by instantiating the first-version VNF software, and the initiating, by the VNFM, a software modification operation for the first VNF instance of the first-version VNF software based on the software modification type includes:

initiating, by the VNFM in a running process of the first VNF instance, the software modification operation for the first VNF instance of the first-version VNF software based on the software modification type.

It can be learned from the foregoing that, in the software modification initiation method provided in this possible design, in addition to the technical effect, described in the first aspect, of implementing the automatic modification operations for the VNF instance of the VNF software in the NFV system, the VNFM initiates the software modification operation for the first VNF instance of the first-version VNF software in the running process of the first VNF instance. In other words, in this software modification initiation operation process, the software modification operation can be initiated for the first-version VNF software, without a need of interrupting the first VNF instance that is currently running in the NFV system. This helps maintain stability and service continuity of the NFV system in a VNF software modification process.

In a possible design, the software modification type in the metadata is a VNF software upgrade.

In a possible design, the NFV system further includes an element manager EM and a virtualized network function operation and maintenance VNF O&M device, and the initiating, by the VNFM, a software modification operation for the first VNF instance of the first-version VNF software based on the software modification type includes:

obtaining, by the VNFM, a deployment option used to instantiate second-version VNF software into a second VNF instance;

instantiating, by the VNFM, the second-version VNF software into the second VNF instance based on the deployment option; and sending, by the VNFM, a software upgrade request to the EM or the VNF O&M device, where the software upgrade request is used to instruct the EM or the VNF O&M device to upgrade the first VNF instance of the first-version VNF software to the second VNF instance of the second-version VNF software.

It can be learned from the foregoing that, in the software modification initiation method provided in this possible design, in addition to the technical effect, described in the first aspect, of implementing the automatic modification operations for the VNF instance of the VNF software in the NFV system, only after a resource of the second VNF instance is established, the VNFM instructs the EM or the VNF O&M device to initiate the software upgrade. In other words, only when it is ensured that the second instance has been established, the VNFM further instructs the EM or the VNF O&M device to perform the software upgrade operation. This avoids a case in which the first-version VNF software fails to be upgraded because the second instance is not successfully established, and helps improve stability and reliability of the upgrade of the first VNF instance of the first-version VNF software.

In a possible design, the metadata further includes a mapping relationship between a software upgrade policy and a resource option, the deployment option includes a resource option and a connection option, and the obtaining, by the VNFM, a deployment option used to instantiate second-version VNF software into a second VNF instance includes:

obtaining, by the VNFM, a target software upgrade policy, in the VNF LCM request, used for the upgrade to the second VNF instance of the second-version VNF software;

determining, by the VNFM based on the mapping relationship between a software upgrade policy and a resource option that is in the metadata, a resource option corresponding to the target software upgrade policy; and determining, by the VNFM, a connection option corresponding to the resource option.

It can be learned from the foregoing that, in the software modification initiation method provided in this possible design, in addition to the technical effect, described in the first aspect, of implementing the automatic modification operations for the VNF instance of the VNF software in the NFV system, the deployment option (including the resource option and the connection option) of a resource used to establish the second instance can be determined according to the target software upgrade policy and the mapping relationship that are carried in the metadata. Therefore, the deployment option does not need to be carried in the VNF LCM request. This reduces an amount of information carried in the request message, and helps improve reliability and efficiency of signaling interworking between the VNFM and another network element of the NFV system.

In a possible design, the obtaining, by the VNFM, a deployment option used to instantiate second-version VNF software into a second VNF instance includes:

obtaining, by the VNFM, the deployment option, in the VNF LCM request, used to instantiate the second-version VNF software into the second VNF instance.

It can be learned from the foregoing that, in the software modification initiation method provided in this possible design, in addition to the technical effect, described in the first aspect, of implementing the automatic modification operations for the VNF instance of the VNF software in the NFV system, the deployment option of a resource used to establish the second instance is directly carried in the VNF LCM request. Information, such as the upgrade policy and the mapping relationship, does not need to be carried in the metadata, reducing an information amount of the metadata. In addition, the connection option does not need to be determined based on the resource option. This simplifies a signaling interworking process, and helps improve efficiency of modifying the first-version VNF software.

In a possible design, the software modification type in the metadata is a VNF software update.

In a possible design, the initiating, by the VNFM, a software modification operation for the first VNF instance of the first-version VNF software based on the software modification type includes:

obtaining, by the VNFM, a file name and an access address of a target executable file that is used for an update to a second VNF instance of the second-version VNF software, and a mapping relationship between an executable file and a software image, where the file name, the access address, and the mapping relationship are in the metadata, and an instance identifier of the first VNF instance is consistent with an instance identifier of the second VNF instance;

obtaining, by the VNFM, the target executable file based on the access address and the file name;

determining, by the VNFM based on the mapping relationship between an executable file and a software image, a software image corresponding to the target executable file;

determining, by the VNFM based on the software image, a virtual machine corresponding to a to-be-updated virtualized network function component VNFC instance in the first VNF instance; and sending, by the VNFM, a software update request, where the software update request is used to instruct the virtual machine to run the executable file to update the VNFC instance.

It can be learned from the foregoing that, in the software modification initiation method provided in this possible design, in addition to the technical effect, described in the first aspect, of implementing the automatic modification operations for the VNF instance of the VNF software in the NFV system, after obtaining the file name and the access address of the target executable file that is used for the update to the second VNF instance of the second-version VNF software, and the mapping relationship between an executable file and a software image, the VNFM obtains the target executable file; determines the software image corresponding to the target executable file; then determines, based on the software image, the virtual machine of the to-be-updated VNFC instance; and finally sends the software update request, to instruct the virtual machine to run the executable file to update the VNFC instance. Because the to-be-updated VNFC instance is not interrupted in an update process, a hitless update of the first VNF instance is implemented. This helps improve reliability and stability of the NFV system in a software update process.

In a possible design, the obtaining, by the VNFM, metadata according to the VNF LCM request includes:

extracting, by the VNFM, an identifier, of a software package, in the VNF LCM request; and obtaining, by the VNFM, the metadata in the software package based on the identifier of the software package.

In a possible design, the VNF LCM request is generated by the NFVO after the NFVO receives a network service update request sent by an operation support system OSS.

In a possible design, after the initiating, by the VNFM, a software modification operation for the first VNF instance of the first-version VNF software based on the software modification type, the method further includes:

sending, by the VNFM, a VNF LCM response to the NFVO.

In a possible design, the software modification type in the metadata is a virtualized network function component VNFC software upgrade, and the to-be-modified first-version VNF software includes first VNFC software.

In a possible design, the NFV system runs a first VNFC instance, the first VNFC instance is obtained by the NFV system by instantiating the first VNFC software, the metadata further includes an image identifier, used to upgrade the first VNFC software, of a software image of second VNFC software, and the NFV system further includes an element manager EM and a virtualized network function operation and maintenance VNF O&M device; and the initiating, by the VNFM, a software modification operation for the first VNF instance of the first-version VNF software based on the software modification type includes:

determining, by the VNFM, that the software modification type in the metadata is the VNFC software upgrade, and determining an instance identifier of the first VNFC instance based on an instance identifier of the first VNF instance;

instantiating, by the VNFM, the second VNFC software into a second VNFC instance based on the instance identifier of the first VNFC instance and the image identifier of the software image of the second VNFC software; and sending, by the VNFM, a software upgrade request to the EM or the VNF O&M device, where the software upgrade request is used to instruct the EM or the VNF O&M device to upgrade the first VNFC instance to the second VNFC instance.

In a possible design, the determining, by the VNFM, an instance identifier of the first VNFC instance based on an instance identifier of the first VNF instance includes:

determining, by the VNFM, an image identifier of a software image of the first VNFC software in the first-version VNF software based on the instance identifier of the first VNF instance; and determining, by the VNFM, the instance identifier of the first VNFC instance based on the image identifier of the software image of the first VNFC software; and the instantiating, by the VNFM, the second VNFC software into a second VNFC instance based on the instance identifier of the first VNFC instance and the image identifier of the software image of the second VNFC software includes:

applying, by the VNFM, for a resource based on the instance identifier of the first VNFC instance; and instantiating, by the VNFM, the second VNFC software into the second VNFC instance based on the resource obtained by application and the image identifier of the software image of the second VNFC software.

In a possible design, the VNF LCM request includes an identifier of a software package and a target software upgrade policy, the software package includes the metadata and a VNF descriptor VNFD, and the metadata further includes an image identifier of a software image of VNFC software and a version identifier of VNF software to which the VNFC software corresponding to the software image belongs;

the determining, by the VNFM, an image identifier of a software image of the first VNFC software in the first-version VNF software based on the instance identifier of the first VNF instance includes:

determining, by the VNFM, the image identifier of the software image of the first VNFC software in the first-version VNF software based on the instance identifier of the first VNF instance, the image identifier of the software image of the VNFC software, and the version identifier of the VNF software to which the VNFC software corresponding to the software image belongs; and the applying, by the VNFM, for a resource based on the instance identifier of the first VNFC instance includes:

determining, by the VNFM, a resource option and a connection option based on the instance identifier of the first VNFC instance, the VNFD, and the target software upgrade policy, and applying for a deployment option based on the resource option, the connection option, and the image identifier of the software image of the second VNFC software.

It can be learned from the foregoing that, in the software modification initiation method provided in this possible design, in addition to the technical effect, described in the first aspect, of implementing the automatic modification operations for the VNF instance of the VNF software in the NFV system, only after a resource of the second VNFC instance is established, the VNFM instructs the EM or the VNF O&M device to initiate the software upgrade. In other words, only when it is ensured that the second VNFC instance has been established, the VNFM further instructs the EM or the VNF O&M device to perform the software upgrade operation. This avoids a case in which the first VNFC instance fails to be upgraded because the second VNFC instance is not successfully established, and helps improve stability and reliability of the upgrade of the to-be-upgraded first VNFC instance.

According to a second aspect, an embodiment of the present invention provides a metadata release method, including:

generating metadata, where the metadata includes a version identifier of first-version VNF software, in an NFV system, suitable for being modified to second-version VNF software, and a software modification type; and releasing the metadata.

It can be learned from the foregoing that, in the metadata release method provided in this embodiment of the present invention, the released metadata includes the version identifier of the to-be-updated first-version VNF software corresponding to a first VNF instance, and the software modification type, so that after receiving the released metadata, the NFV system can quickly identify the software that needs to be modified, and initiate, based on the software modification type in the metadata, a software modification operation for the first VNF instance of the to-be-modified first-version VNF software. It can be learned that the process of initiating the software modification operation for the first VNF instance of the first-version VNF software is sequentially executed by a VNFM based on related information of the metadata, and no user participation is required. This implements automatic modification operations for VNF software in the NFV system.

In a possible design, the software modification type is a VNF software upgrade, and the metadata further includes a mapping relationship between a software upgrade policy and a resource option.

It can be learned from the foregoing that, in the metadata release method provided in this possible design, in addition to the technical effect, described in the second aspect, of implementing the automatic modification operations for the VNF software in the NFV system, because a resource option used to instantiate the second-version VNF software into a second VNF instance can be determined based on the mapping relationship between a software upgrade policy and a resource option, a VNFM further determines a connection option corresponding to the resource option after determining the resource option, so as to instantiate the second-version VNF software into the second VNF instance based on the resource option and the connection option. Therefore, the NFV system can perform the software upgrade when it is determined that the second instance has been established. This avoids a case in which the first-version VNF software fails to be upgraded because the second instance is not successfully established, and helps improve stability and reliability of the NFV system in a software upgrade process.

In a possible design, the software modification type is a VNF software update, and the metadata further includes a file name and an access address of a target executable file that is used for an update to the second-version VNF software, and a mapping relationship between an executable file and a software image.

It can be learned from the foregoing that, in the metadata release method provided in this possible design, in addition to the technical effect, described in the second aspect, of implementing the automatic modification operations for the VNF software in the NFV system, because the metadata includes the file name and the access address of the target executable file that is used for the update to the second-version VNF software, and the mapping relationship between an executable file and a software image, a VNFM can obtain the target executable file based on the file name and the access address; determine a software image based on the target executable file; then determine, based on the software image, a virtual machine of a to-be-updated virtualized network function component VNFC instance; and finally send a software update request, to instruct the virtual machine to run the executable file to update the VNFC instance. Because the VNFC instance is not interrupted, a hitless update of a first VNF instance is implemented. This helps improve reliability and stability of the NFV system in a software update process.

In a possible design, the metadata is integrated in a software package.

In a possible design, the software modification type is a virtualized network function component VNFC software upgrade, the first-version VNF software includes first VNFC software, the NFV system runs a first VNFC instance, the first VNFC instance is obtained by the NFV system by instantiating the first VNFC software, and the metadata further includes an image identifier, used to upgrade the first VNFC software, of a software image of second VNFC software.

It can be learned from the foregoing that, in the metadata release method provided in this possible design, in addition to the technical effect, described in the second aspect, of implementing the automatic modification operations for the VNF software in the NFV system, because the metadata includes the image identifier, used to upgrade the first VNFC software, of the software image of the second VNFC software, a VNFM can obtain a second VNFC instance by instantiation based on the image identifier of the software image of the second VNFC software, and instruct an EM or a VNF O&M device to upgrade the first VNFC instance to the second VNFC instance. This avoids a case in which the first VNFC instance fails to be upgraded because the second VNFC instance is not successfully established, and helps improve stability and reliability of the upgrade of the to-be-upgraded first VNFC instance.

According to a third aspect, an embodiment of the present invention provides a virtualized network function manager VNFM. The apparatus has a function of implementing behavior of the VNFM in the foregoing method designs. The function may be implemented by hardware, or may be implemented by hardware executing corresponding software. The hardware or the software includes one or more modules corresponding to the foregoing function.

In a possible design, the VNFM includes a processor. The processor is configured to support the VNFM to execute corresponding functions in the foregoing method. Further, the VNFM may further include a receiver and a transmitter. The receiver and the transmitter are configured to support communication between the VNFM and another network element. Further, the VNFM may further include a memory. The memory is configured to be coupled with the processor, and stores a program instruction and data that are required for the VNFM.

According to a fourth aspect, an embodiment of the present invention provides a metadata release apparatus. The apparatus has a function of implementing behavior of the metadata release apparatus in the foregoing method designs. The function may be implemented by hardware, or may be implemented by hardware executing corresponding software. The hardware or the software includes one or more modules corresponding to the foregoing function.

In a possible design, the metadata release apparatus includes a processor. The processor is configured to support the metadata release apparatus to execute corresponding functions in the foregoing method. Further, the metadata release apparatus may further include a receiver and a transmitter. The receiver and the transmitter are configured to support communication between the metadata release apparatus and another system such as a network functions virtualization NFV system. Further, the metadata release apparatus may further include a memory. The memory is configured to be coupled with the processor, and stores a program instruction and data that are required for the metadata release apparatus.

According to a fifth aspect, an embodiment of the present invention provides a computer readable storage medium. The computer readable storage medium stores program code to be executed by a computer device. The program code specifically includes an executable instruction. The executable instruction is used to perform some or all of the steps described in any method in the first aspect of embodiments of the present invention.

According to a sixth aspect, an embodiment of the present invention provides a computer readable storage medium. The computer readable storage medium stores program code to be executed by a computer device. The program code specifically includes an executable instruction. The executable instruction is used to perform some or all of the steps described in any method in the second aspect of embodiments of the present invention.

It can be learned that, in the software modification initiation method provided in the embodiments of the present invention, the VNFM first determines, according to the VNF LCM request in the NFV system, to perform the software modification operation; then obtains the metadata according to the VNF LCM request; then determines the first VNF instance of the to-be-modified first-version VNF software based on the version identifier in the metadata and the instance identifier in the VNF LCM; and finally initiates the software modification operation for the first VNF instance of the to-be-modified first-version VNF software based on the software modification type in the metadata. It can be learned that the process of initiating the software modification operation for the first VNF instance of the first-version VNF software is sequentially executed by the VNFM, and no user participation is required. This implements automatic modification operations for VNF software in the NFV system.

BRIEF DESCRIPTION OF DRAWINGS

The following briefly describes the accompanying drawings required for the background or embodiments.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of this application without creative efforts shall fall within the protection scope of this application.

For better understanding of the technical solutions of the present invention, the following first briefly describes an architecture of a network functions virtualization (NFV) system.

Figure 1:
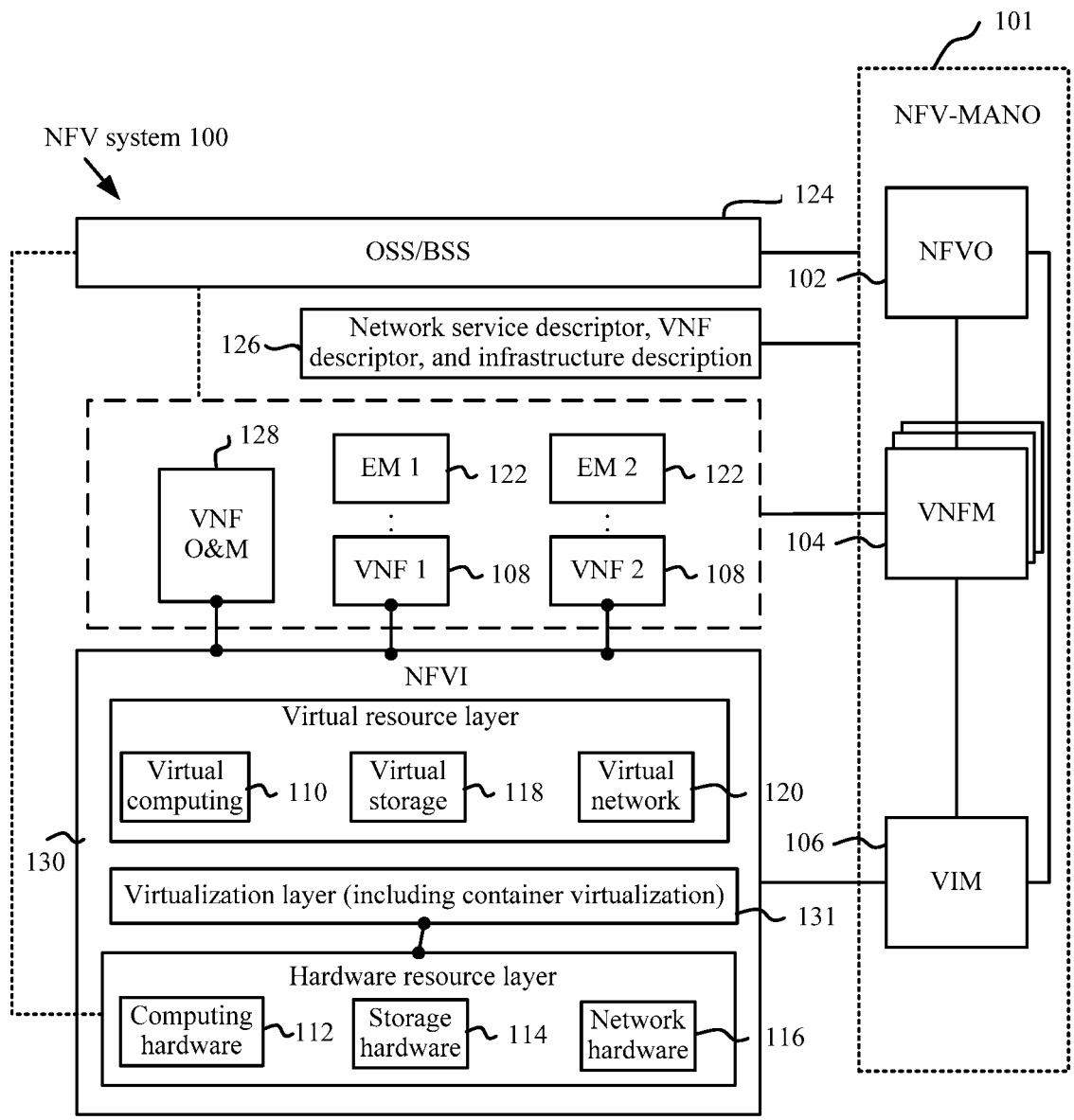
FIG. 1 is a system architectural diagram of a network functions virtualization NFV system 100 according to an embodiment of the present invention.

Referring to FIG. 1, FIG. 1 is a system architectural diagram of a network functions virtualization (NFV) system 100 according to an embodiment of the present invention. The NFV system 100 includes a network functions virtualization management and orchestration (NFV MANO) system 101, a network functions virtualization infrastructure (NFVI) layer 130, a plurality of virtualized network functions (VNF) 108, a plurality of element managers (EM) 122, network service, VNF, and infrastructure descriptions (Network Service, VNF and Infrastructure Description) 126, a virtualized network function operation and maintenance (VNF O&M) device 128, and an operation support system/business support system (OSS/BSS) 124.

The NFV MANO system 101 includes a network functions virtualization orchestrator (NFVO) 102, one or more virtualized network function managers (VNFM) 104, and a virtualized infrastructure manager (VIM) 106.

The NFVO 102 is configured to orchestrate resources of the NFVI layer 130 that are across a plurality of VIMs 106, and perform lifecycle management (LCM) for a network service. The VIM 106 is configured to control and manage computing, storage, and network resources of the NFVI layer 130. These resources are usually in an infrastructure field of a same operator, for example, all resources at a point of presence (POP) of the NFVI layer 130, resources across a plurality of NFVI-POPs, or resources in a subnet of one NFVI-POP. The VNFM 104 is configured to perform lifecycle management for a VNF. The following operations are specifically included: instantiating a VNF 108 (creating the VNF by using a VNF launch function), performing scale-out or scale-in for a VNF 108 (increasing or reducing a capacity of the VNF), updating or upgrading a VNF 108 (supporting various complex changes of VNF software or configurations), or terminating a VNF 108 (releasing a VNF-related NFVI resource to an NFVI resource pool). The NFVI layer 130 includes a hardware resource layer, a virtualization layer (Virtualization Layer) 131, and a virtual resource layer. The hardware resource layer includes computing hardware 112, storage hardware 114, and network hardware 116. The virtual resource layer includes virtual computing 110, virtual storage 118, and a virtual network 120. For example, the computing hardware 112 may include a virtual machine of a virtualized network function component (VNFC) instance in a VNF instance in the NFV system. The network service descriptor, VNF descriptor, and infrastructure descriptor 126 and the OSS/BSS 124 are further described in the European Telecommunications Standards Institute (ETSI) Group Specification (GS) NFV 002 V1.1.1 standard. The NFVI layer 130 includes a hardware resource, a software resource, or a combination of a hardware resource and a software resource, and is configured to deploy a virtualization environment. The hardware resource and the virtualization layer 131 are configured to provide a virtualized resource, and for example, are applied to the VNF 108 as a virtual machine or a virtual container in another form. The hardware resource includes the computing hardware 112, the storage hardware 114, and the network hardware 116. For example, the computing hardware 112 may be existing hardware on a market and/or user-customized hardware, and is configured to provide processing and computing resources. For example, the storage hardware 114 may be a storage capacity provided in a network or a storage capacity (a local memory in a server) of the storage hardware 114. In an implementation solution, resources of the computing hardware 112 and the storage hardware 114 may be centralized. For example, the network hardware 116 may be a switch or a router, and/or may be configured as any other network device that has a switching function. The network hardware 116 may be across a plurality of domains, and may include a plurality of networks that are connected by one or more transport networks.

A current NFV standard does not define an operation used to update or upgrade VNF software in the NFV system. In addition, a conventional method used to update or upgrade network function software is applicable only to a system including a single management, operation, and maintenance system, and cannot be directly used for VNF software of an NFV system including two management, operation, and maintenance systems. To resolve the foregoing problem, the embodiments of the present invention provide a software modification initiation method and a metadata release method and apparatus. The following provides detailed descriptions.

Figure 2:
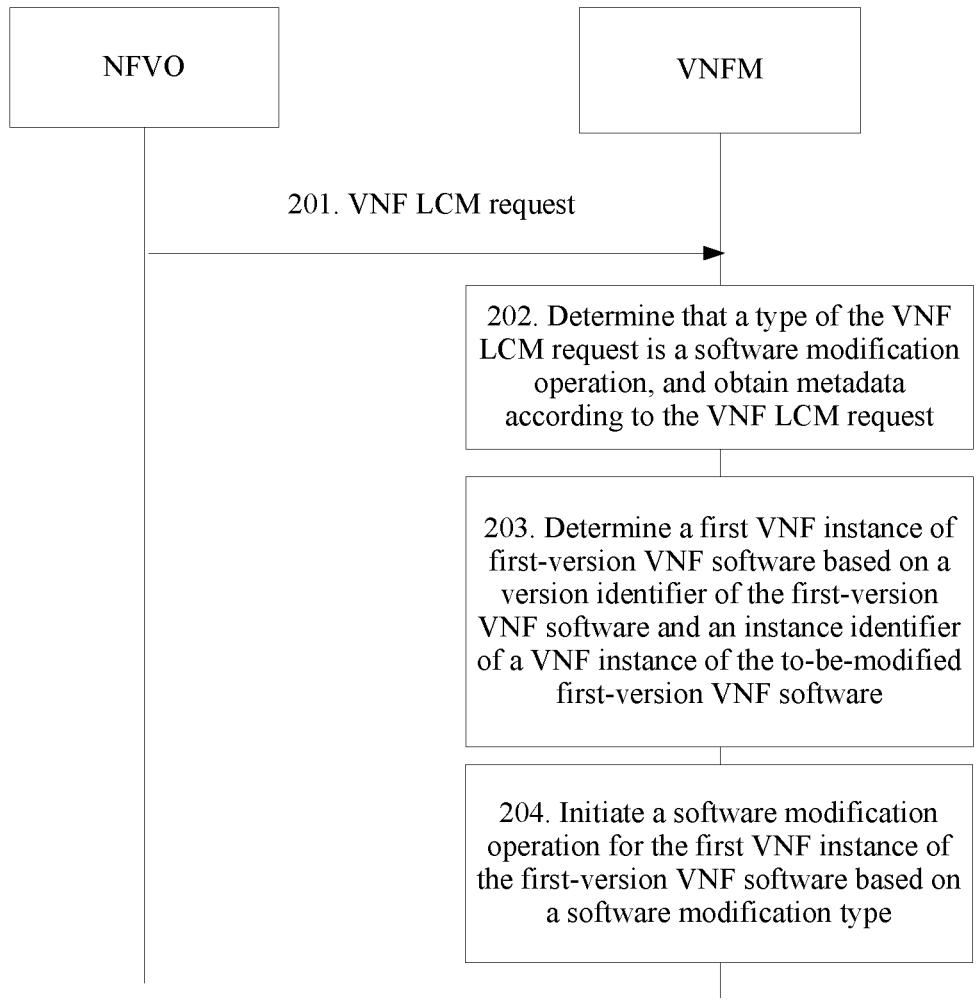
FIG. 2 is a schematic flowchart of a software modification initiation method according to an embodiment of the present invention.

Referring to FIG. 2, FIG. 2 is a software modification initiation method according to an embodiment of the present invention. The method is applied to a network functions virtualization NFV system. The NFV system includes a virtualized network function manager VNFM and a network functions virtualization orchestrator NFVO. As shown in the figure, the method includes the following steps.

S201. The NFVO sends a virtualized network function VNF lifecycle management (LCM) request to the VNFM. The VNF LCM request includes an instance identifier of a VNF instance of to-be-modified first-version VNF software.

Although the VNF LCM request shown in FIG. 2 is received from the NFVO, it may be understood that, in some other examples, the VNF LCM request may be received from another network element device (such as an element manager EM or a virtualized network function operation and maintenance VNF O&M device). For details, refer to embodiments in FIG. 4A(a) and FIG. 4A(b) to FIG. 4E, and FIG. 5A.

The VNF LCM request is a request message used to instruct the VNFM to perform lifecycle management for a VNF instance in the NFV system. For example, performing lifecycle management for a VNF instance may include: creating a new VNF instance, increasing or reducing a capacity of a VNF instance, terminating a VNF, or modifying VNF software corresponding to a VNF instance, where the modification operation is newly added. Specifically, the VNF LCM request carries type information of a software modification operation, to instruct to modify VNF software corresponding to the VNF instance.

The VNF LCM request may further include request type description information that a type of the current VNF LCM request indicates a software modification operation, and the like.

S202. The VNFM determines that a type of the VNF LCM request indicates a software modification operation, and obtains metadata according to the VNF LCM request. The metadata includes a version identifier of the first-version VNF software and a software modification type.

The metadata includes at least one version identifier of VNF software. The at least one version identifier of VNF software includes the version identifier of the first-version VNF software.

The metadata (Metadata) is data that describes data, is mainly information that describes a data attribute, and is used to support functions such as storage location indication, historical data, resource searching, and file recording. The metadata obtained by the VNFM is metadata used for a software modification. The metadata used for a software modification is data provided for an execution entity (such as the VNFM) related to the software modification.

The second-version VNF software is new-version VNF software whose release time is later than that of the first-version VNF software. For example, a version of the second-version VNF software is V2.0, a version of the first-version VNF software is V1.0, and a release time of V1.0 is Sep. 10, 2016; then a release time of V2.0 should be a date later than Sep. 10, 2016, for example, Oct. 10, 2016.

The software modification type may include a VNF software upgrade and a VNF software update. The VNF software upgrade is to upgrade a VNF instance corresponding to VNF software, and is specifically to update all virtualized network function component VNFC instances of the VNF instance to implement the upgrade. The VNF software update is to update one or more (but not all) VNFC instances in a VNF instance corresponding to VNF software.

An implementation of determining, by the VNFM, that the type of the VNF LCM request is a software modification operation may include:
obtaining, by the VNFM, the request type description information in the VNF LCM request; and determining, by the VNFM based on the request type description information, that the type of the VNF LCM request is a software modification operation.

S203. The VNFM determines a first VNF instance of the first-version VNF software based on the version identifier of the first-version VNF software and the instance identifier of the VNF instance of the to-be-modified first-version VNF software.

S204. The VNFM initiates a software modification operation for the first VNF instance of the first-version VNF software based on the software modification type.

It can be learned that, in the software modification initiation method provided in this embodiment of the present invention, the VNFM first determines, according to the VNF LCM request in the NFV system, to perform the software modification operation; then obtains the metadata according to the VNF LCM request; then determines the first VNF instance of the to-be-modified first-version VNF software based on the version identifier in the metadata and the instance identifier in the VNF LCM; and finally initiates the software modification operation for the first VNF instance of the to-be-modified first-version VNF software based on the software modification type in the metadata. It can be learned that the process of initiating the software modification operation for the first VNF instance of the first-version VNF software is sequentially executed by the VNFM, and no user participation is required. This implements automatic modification operations for VNF software in the NFV system.

In an example, the NFV system runs the first VNF instance. The first VNF instance is obtained by the NFV system by instantiating the first-version VNF software. The initiating, by the VNFM, a software modification operation for the first VNF instance of the first-version VNF software based on the software modification type includes:
initiating, by the VNFM in a running process of the first VNF instance, the software modification operation for the first VNF instance of the first-version VNF software based on the software modification type.

It can be learned from the foregoing that, in the software modification initiation method provided in this example, in addition to the technical effect of implementing the automatic modification operations for the VNF software in the NFV system, the VNFM initiates the software modification operation for the first VNF instance of the first-version VNF software in the running process of the first VNF instance. In other words, in this software modification initiation operation process, the software modification operation can be initiated for the first-version VNF software, without a need of interrupting the first VNF instance that is currently running in the NFV system. This helps maintain stability and service continuity of the NFV system in a VNF software modification process.

In an example, the software modification type in the metadata is the VNF software upgrade.

In this example, the NFV system further includes an element manager EM and a virtualized network function operation and maintenance VNF O&M device. An implementation of initiating, by the VNFM, the software modification operation for the first VNF instance of the first-version VNF software based on the software modification type may include:

obtaining, by the VNFM, a deployment option used to instantiate the second-version VNF software into a second VNF instance;

instantiating, by the VNFM, the second-version VNF software into the second VNF instance based on the deployment option; and sending, by the VNFM, a software upgrade request to the EM or the VNF O&M device, where the software upgrade request is used to instruct the EM or the VNF O&M device to upgrade the first VNF instance of the first-version VNF software to the second VNF instance of the second-version VNF software.

It can be learned from the foregoing that, in the software modification initiation method provided in this example, in addition to the technical effect of implementing the automatic modification operations for the VNF software in the NFV system, only after a resource of the second VNF instance is established, the VNFM instructs the EM or the VNF O&M device to initiate the software upgrade. In other words, only when it is ensured that the second instance has been established, the VNFM further instructs the EM or the VNF O&M device to perform the software upgrade operation. This avoids a case in which the first-version VNF software fails to be upgraded because the second instance is not successfully established, and helps improve stability and reliability of the upgrade of the first VNF instance of the first-version VNF software.

In this example, the metadata further includes a mapping relationship between a software upgrade policy and a resource option. The VNF LCM request further includes a target software upgrade policy used for the upgrade to the second VNF instance of the second-version VNF software. The deployment option includes a resource option and a connection option. A specific implementation of the obtaining, by the VNFM, a deployment option used to instantiate the second-version VNF software into a second VNF instance may be:

obtaining, by the VNFM, the target software upgrade policy, in the VNF LCM request, used for the upgrade to the second VNF instance of the second-version VNF software;

determining, by the VNFM based on the mapping relationship between a software upgrade policy and a resource option that is in the metadata, a resource option corresponding to the target software upgrade policy; and determining, by the VNFM, a connection option corresponding to the resource option.

For example, the target software upgrade policy may be a software upgrade policy classified by area, or may be an upgrade policy classified by user quantity proportion, and specifically, may be flexibly set depending on an upgrade service requirement.

The resource option includes a computing resource, a storage resource, and a connection resource that are used to instantiate VNF software. The connection option is configuration information indicating how connection points of the resource option are connected to each other. The connection points may be specifically internal connection points or external connection points. For example, the resource option includes a computer A and a computer B, and the connection points include a connection point 1 of the computer A and a connection point 2 of the computer B; then a connection option corresponding to the computer A and the computer B may be specifically configuration information of a connection between the connection point 1 and the connection point 2.

In an implementation, after obtaining the target software upgrade policy, the VNFM may determine, by querying for a mapping relationship list (the mapping relationship between a software upgrade policy and a resource option that is in the metadata may be stored in the mapping relationship list), the resource option corresponding to the target software upgrade policy.

It can be learned from the foregoing that, in the software modification initiation method provided in this example, in addition to the technical effect of implementing the automatic modification operations for the VNF software in the NFV system, the deployment option (including the resource option and the connection option) of a resource used to establish the second instance can be determined according to the target software upgrade policy and the mapping relationship that are carried in the metadata. Therefore, the deployment option does not need to be carried in the VNF LCM request. This reduces an amount of information carried in the request message, and helps improve reliability and efficiency of signaling interworking between the VNFM and another network element of the NFV system.

In an example, the metadata further includes a plurality of software upgrade policies, and the plurality of software upgrade policies include the target software upgrade policy.

In this example, a specific implementation of the obtaining, by the VNFM, a deployment option used to instantiate the second-version VNF software into a second VNF instance may be:

obtaining, by the VNFM, the deployment option, in the VNF LCM request, used to instantiate the second-version VNF software into the second VNF instance.

It can be learned from the foregoing that, in the software modification initiation method provided in this example, in addition to the technical effect of implementing the automatic modification operations for the VNF software in the NFV system, the deployment option of a resource used to establish the second instance is directly carried in the VNF LCM request. Information, such as the upgrade policy and the mapping relationship, does not need to be carried in the metadata, reducing an information amount of the metadata. In addition, the connection option does not need to be determined based on the resource option. This simplifies a signaling interworking process, and helps improve efficiency of modifying the first-version VNF software.

In an example, the software modification type in the metadata is the VNF software update.

In this example, initiating, by the VNFM, the software modification operation for the first VNF instance of the first-version VNF software based on the software modification type includes:

obtaining, by the VNFM, a file name and an access address of a target executable file that is used for an update to a second VNF instance of the second-version VNF software, and a mapping relationship between an executable file and a software image, where the file name, the access address, and the mapping relationship are in the metadata, and an instance identifier of the first VNF instance is consistent with an instance identifier of the second VNF instance;

obtaining, by the VNFM, the target executable file based on the access address and the file name;

determining, by the VNFM based on the mapping relationship between an executable file and a software image, a software image corresponding to the target executable file;

determining, by the VNFM based on the software image, a virtual machine corresponding to a to-be-updated virtualized network function component VNFC instance in the first VNF instance; and sending, by the VNFM, a software update request, where the software update request is used to instruct the virtual machine to run the executable file to update the VNFC instance.

The VNFC instance is any VNFC instance in the VNF instance, and the VNFC instance runs on the virtual machine. The virtual machine may be implemented by running the software image corresponding to the VNFC instance. In other words, one VNF instance corresponds to one piece of VNF software, one piece of VNF software includes at least one software image, and one software image is corresponding to one VNFC instance.

In an implementation, sending, by the VNFM, the software update request may include:

sending, by the VNFM, the software update request to the determined virtual machine; or sending, by the VNFM, the software update request to a VIM in the NFV system; and forwarding, by the VIM, the software update request to the determined virtual machine.

It can be learned from the foregoing that, in the software modification initiation method provided in this example, in addition to the technical effect of implementing the automatic modification operations for the VNF software in the NFV system, after obtaining the file name and the access address of the target executable file that is used for the update to the second VNF instance of the second-version VNF software, and the mapping relationship between an executable file and a software image, the VNFM obtains the target executable file; determines the software image corresponding to the target executable file; then determines, based on the software image, the virtual machine of the to-be-updated VNFC instance; and finally sends the software update request, to instruct the virtual machine to run the executable file to update the VNFC instance. Because the to-be-updated VNFC instance is not interrupted in an update process, a hitless update of the first VNF instance is implemented. This helps improve reliability and stability of the NFV system in a software update process.

In an example, the obtaining, by the VNFM, metadata according to the VNF LCM request includes:

extracting, by the VNFM, an identifier, of a software package, in the VNF LCM request; and obtaining, by the VNFM, the metadata in the software package based on the identifier of the software package.

In this example, the VNF LCM request is generated by the NFVO after the NFVO receives a network service update request sent by an operation support system OSS.

In an example, after the initiating, by the VNFM, a software modification operation for the first VNF instance of the first-version VNF software based on the software modification type, the method further includes:

sending, by the VNFM, a VNF LCM response to the NFVO.

In one example, it is contemplated that the software modification type in the metadata indicates a virtualized network function component VNFC software upgrade, and the to-be-modified first-version VNF software includes first VNFC software.

In this possible example, the NFV system runs a first VNFC instance. The first VNFC instance is obtained by the NFV system by instantiating the first VNFC software. The metadata further includes an image identifier, used to upgrade the first VNFC software, of a software image of second VNFC software. The NFV system further includes an element manager EM and a virtualized network function operation and maintenance VNF O&M device.

The initiating, by the VNFM, a software modification operation for the first VNF instance of the first-version VNF software based on the software modification type includes:

determining, by the VNFM, that the software modification type in the metadata is the VNFC software upgrade, and determining an instance identifier of the first VNFC instance based on an instance identifier of the first VNF instance;

instantiating, by the VNFM, the second VNFC software into a second VNFC instance based on the instance identifier of the first VNFC instance and the image identifier of the software image of the second VNFC software; and sending, by the VNFM, a software upgrade request to the EM or the VNF O&M device, where the software upgrade request is used to instruct the EM or the VNF O&M device to upgrade the first VNFC instance to the second VNFC instance.

In this example, the determining, by the VNFM, an instance identifier of the first VNFC instance based on an instance identifier of the first VNF instance includes:

determining, by the VNFM, an image identifier of a software image of the first VNFC software in the first-version VNF software based on the instance identifier of the first VNF instance; and determining, by the VNFM, the instance identifier of the first VNFC instance based on the image identifier of the software image of the first VNFC software.

In some implementations, instantiating, by the VNFM, the second VNFC software into the second VNFC instance based on the instance identifier of the first VNFC instance and the image identifier of the software image of the second VNFC software may include:

applying, by the VNFM, for a resource based on the instance identifier of the first VNFC instance; and instantiating, by the VNFM, the second VNFC software into the second VNFC instance based on the resource obtained by application and the image identifier of the software image of the second VNFC software.

In this example, the VNF LCM request includes an identifier of a software package and a target software upgrade policy. The software package includes the metadata and a VNF descriptor VNFD. The metadata further includes an image identifier of a software image of VNFC software and a version identifier of VNF software to which the VNFC software corresponding to the software image belongs.

In some implementations, determining, by the VNFM, the image identifier of a software image of the first VNFC software in the first-version VNF software based on the instance identifier of the first VNF instance may include:

determining, by the VNFM, the image identifier of the software image of the first VNFC software in the first-version VNF software based on the instance identifier of the first VNF instance, the image identifier of the software image of the VNFC software, and the version identifier of the VNF software to which the VNFC software corresponding to the software image belongs.

In some implementations, applying, by the VNFM, for the resource based on the instance identifier of the first VNFC instance includes:

determining, by the VNFM, a resource option and a connection option based on the instance identifier of the first VNFC instance, the VNFD, and the target software upgrade policy, and applying for a deployment option based on the resource option, the connection option, and the image identifier of the software image of the second VNFC software.

It can be learned from the foregoing that, in the software modification initiation method provided in this possible design, in addition to the technical effect, described in the first aspect, of implementing the automatic modification operations for the VNF instance of the VNF software in the NFV system, only after a resource of the second VNFC instance is established, the VNFM instructs the EM or the VNF O&M device to initiate the software upgrade. In other words, only when it is ensured that the second VNFC instance has been established, the VNFM further instructs the EM or the VNF O&M device to perform the software upgrade operation. This avoids a case in which the first VNFC instance fails to be upgraded because the second VNFC instance is not successfully established, and helps improve stability and reliability of the upgrade of the to-be-upgraded first VNFC instance.

Figure 3:
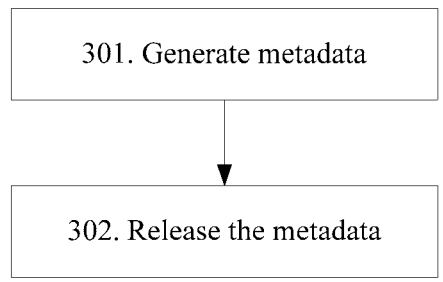
FIG. 3 is a schematic flowchart of a metadata release method according to an embodiment of the present invention.

Consistent with the software modification initiation method shown in FIG. 2, referring to FIG. 3, FIG. 3 is a schematic flowchart of a metadata release method according to an embodiment of the present invention. As shown in the figure, the method includes the following steps.

S301. Generate metadata, where the metadata includes a version identifier of first-version VNF software, in an NFV system, suitable for being modified to second-version VNF software, and a software modification type.

The first-version VNF software is instantiated into a first VNF instance in the NFV system.

The metadata includes at least one version identifier of VNF software. The at least one version identifier of VNF software includes the version identifier of the first-version VNF software.

S302. Release the metadata.

It can be learned that, in the metadata release method provided in this embodiment of the present invention, the released metadata includes the version identifier of the to-be-updated first-version VNF software, and the software modification type, so that after receiving the released metadata, the NFV system can quickly identify the software that needs to be modified, and initiate, based on the software modification type in the metadata, a software modification operation for the to-be-modified first-version VNF software. It can be learned that the process of initiating the software modification operation for the first-version VNF software is sequentially executed by a VNFM based on related information of the metadata, and no user participation is required. This implements automatic modification operations for VNF software in the NFV system.

In an example, the software modification type is a VNF software upgrade. The metadata further includes a mapping relationship between a software upgrade policy and a resource option.

It can be learned from the foregoing that, in the metadata release method provided in this example, in addition to the technical effect of implementing the automatic modification operations for the VNF software in the NFV system, because a resource option used to instantiate the second-version VNF software into a second VNF instance can be determined based on the mapping relationship between a software upgrade policy and a resource option, a VNFM further determines a connection option corresponding to the resource option after determining the resource option, so as to instantiate the second-version VNF software into the second VNF instance based on the resource option and the connection option. Therefore, the NFV system can perform the software upgrade when it is determined that the second instance has been established. This avoids a case in which the first-version VNF software fails to be upgraded because the second instance is not successfully established, and helps improve stability and reliability of the NFV system in a software upgrade process.

In an example, the metadata may further include a plurality of software upgrade policies, and the plurality of software upgrade policies may include the target software upgrade policy.

In an example, the software modification type indicates a VNF software update. The metadata further includes a file name and an access address of a target executable file that is used for an update to the second-version VNF software, and a mapping relationship between an executable file and a software image.

The software image indicates a software image of VNFC software of a to-be-updated VNF. The target executable file is an executable file corresponding to the software image used to update the VNFC software of the to-be-updated VNF. The mapping relationship includes an executable file name, a software image identifier, and a correspondence between the executable file name and the software image identifier.

It can be learned from the foregoing that, in the metadata release method provided in this example, in addition to the technical effect of implementing the automatic modification operations for the VNF software in the NFV system, because the metadata includes the file name and the access address of the target executable file that is used for the update to the second-version VNF software, and the mapping relationship between an executable file and a software image, a VNFM can obtain the target executable file based on the file name and the access address; determine the software image based on the target executable file; then determine, based on the software image, a virtual machine of a to-be-updated virtualized network function component VNFC instance; and finally send a software update request, to instruct the virtual machine to run the executable file to update the VNFC instance. Because the VNFC instance is not interrupted, a hitless update of the first VNF instance is implemented. This helps improve reliability and stability of the NFV system in a software update process.

In an example, the metadata is integrated in a software package.

A version of the first-version VNF software indicates an applicable version of a same type of VNF software released earlier than a release date of the second-version VNF software.

In an example, the software modification type indicates a virtualized network function component VNFC software upgrade. The first-version VNF software includes first VNFC software. The NFV system runs a first VNFC instance. The first VNFC instance is obtained by the NFV system by instantiating the first VNFC software. The metadata further includes an image identifier, used to upgrade the first VNFC software, of a software image of second VNFC software.

In this example, the VNF LCM request includes an identifier of a software package and a target software upgrade policy. The software package includes the metadata and a VNF descriptor VNFD. The metadata further includes an image identifier of a software image of VNFC software and a version identifier of VNF software to which the VNFC software corresponding to the software image belongs. The NFV system further includes an element manager EM and a virtualized network function operation and maintenance VNF O&M device.

It can be learned from the foregoing that, in the metadata release method provided in this design, in addition to the technical effect, described in the second aspect, of implementing the automatic modification operations for the VNF software in the NFV system, because the metadata includes the image identifier, used to upgrade the first VNFC software, of the software image of the second VNFC software, a VNFM can obtain a second VNFC instance by instantiation based on the image identifier of the software image of the second VNFC software, and instruct the EM or the VNF O&M device to upgrade the first VNFC instance to the second VNFC instance. This avoids a case in which the first VNFC instance fails to be upgraded because the second VNFC instance is not successfully established, and helps improve stability and reliability of the upgrade of the to-be-upgraded first VNFC instance.

With reference to specific application scenarios, the following further describes the metadata release method provided in this embodiment of the present invention.

Figure 4:
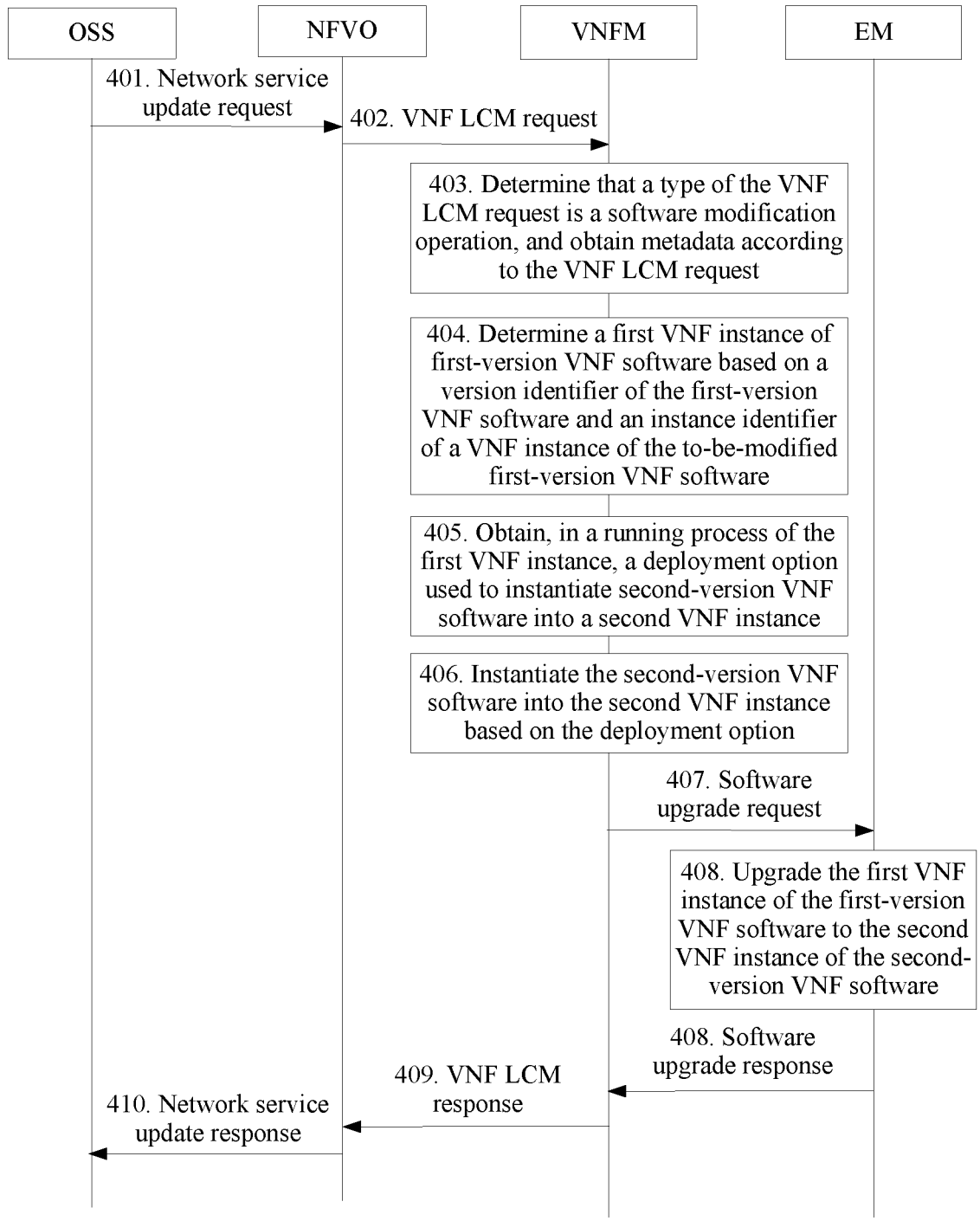
FIG. 4 is a schematic flowchart of a software upgrade initiation method according to an embodiment of the present invention.

Referring to FIG. 4, assuming that the software modification type in the metadata is a VNF software upgrade, the software modification initiation method provided in the embodiments of the present invention is a software upgrade initiation method. The method may include the following steps.

S401. An operation support system OSS sends a network service update request (such as an Update NS request) to a network functions virtualization orchestrator NFVO.

For example, the network service update request may include an instance identifier of a network service instance, a type of the network service update request, an instance identifier of a second VNF instance, a target software upgrade policy, an instance identifier of a VNF instance of to-be-modified first-version VNF software, and an identifier of a software package including metadata.

S402. After receiving the network service update request, the NFVO sends a virtualized network function (VNF) lifecycle management (LCM) request to a VNFM, where the VNF LCM request includes an instance identifier of a VNF instance of to-be-upgraded first-version VNF software.

S403. The VNFM determines that a type of the VNF LCM request indicates a software modification operation, and obtains metadata according to the VNF LCM request.

The metadata includes a version identifier of the first-version VNF software and a software modification type.

An implementation of obtaining, by the VNFM, metadata according to the VNF LCM request can include:

extracting, by the VNFM, the identifier, of the software package, in the VNF LCM request; and obtaining, by the VNFM, the metadata in the software package based on the identifier of the software package.

S404. The VNFM determines a first VNF instance of the first-version VNF software based on the version identifier of the first-version VNF software and the instance identifier of the VNF instance of the to-be-modified first-version VNF software.

S405. The VNFM obtains, in a running process of the first VNF instance, a deployment option used to instantiate second-version VNF software into a second VNF instance.

S406. The VNFM instantiates the second-version VNF software into the second VNF instance based on the deployment option.

S407. The VNFM sends a software upgrade request to an element manager EM, where the software upgrade request is used to instruct the EM to upgrade the first VNF instance of the first-version VNF software to the second VNF instance of the second-version VNF software.

For example, the software upgrade request may include the following information: an instance identifier of the first VNF instance, the instance identifier of the second VNF instance, the version identifier of the first-version VNF software, a version identifier of the second-version VNF software, and the target software upgrade policy.

S408. The EM upgrades the first VNF instance of the first-version VNF software to the second VNF instance of the second-version VNF software, and sends a software upgrade response to the VNFM.

For example, the software upgrade response may include the version identifier of the first-version VNF software, the version identifier of the second-version VNF software, the instance identifier of the first VNF instance that is upgraded, and the instance identifier of the second VNF instance that is obtained after the upgrade.

S409. The VNFM sends a VNF LCM response to the NFVO after receiving the software upgrade response.

For example, the VNF LCM response may include the instance identifier of the first VNF instance that is upgraded and the instance identifier of the second VNF instance that is obtained after the upgrade.

S410. The NFVO sends a network service update response to the OSS after receiving the VNF LCM response.

For example, the network service update response may include the instance identifier of the first VNF instance that is upgraded and the instance identifier of the second VNF instance that is obtained after the upgrade.

Figure 4A:
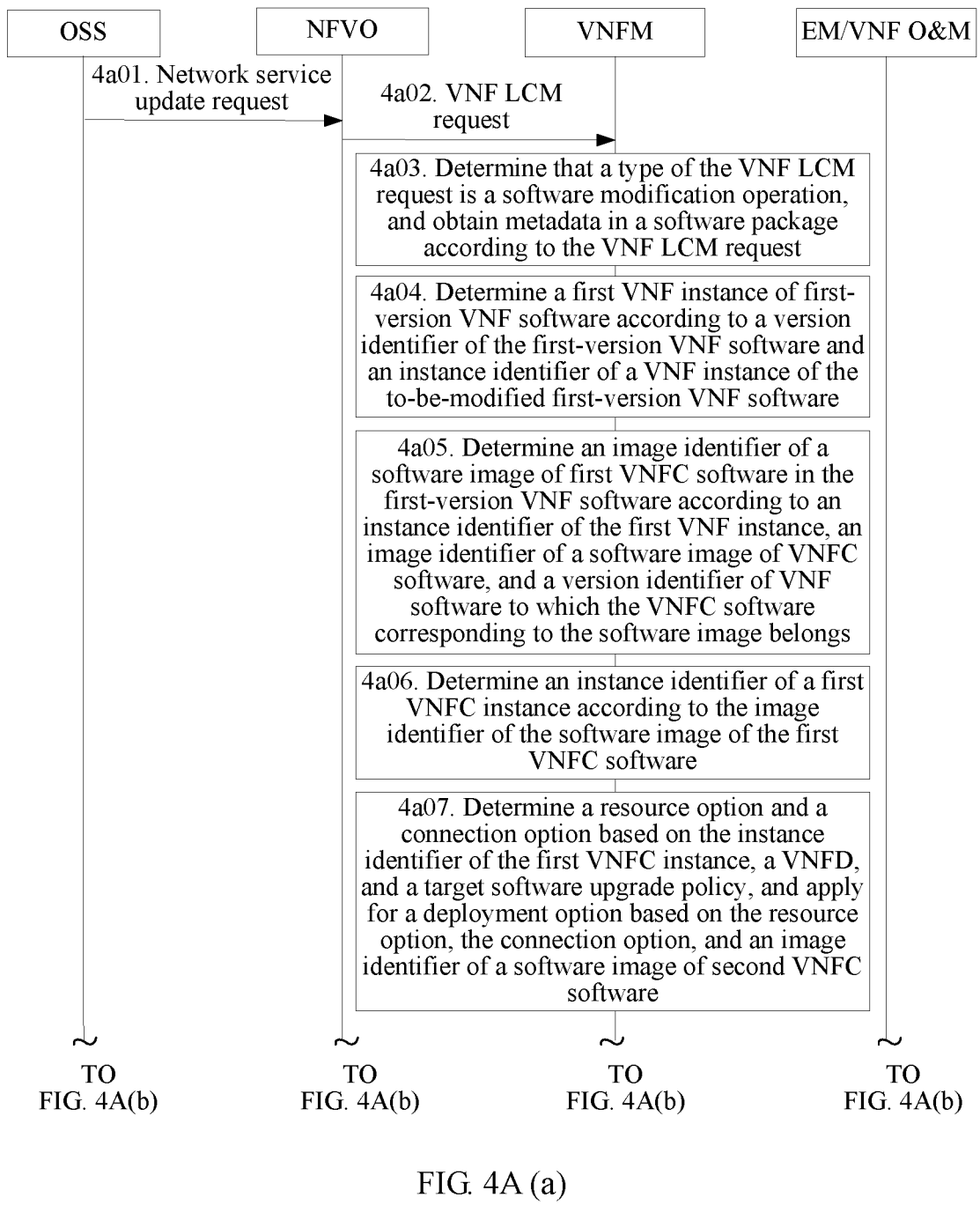
FIG. 4A (a) and FIG. 4A (b) are a schematic flowchart of another software upgrade initiation method according to an embodiment of the present invention.
Figure 4A:
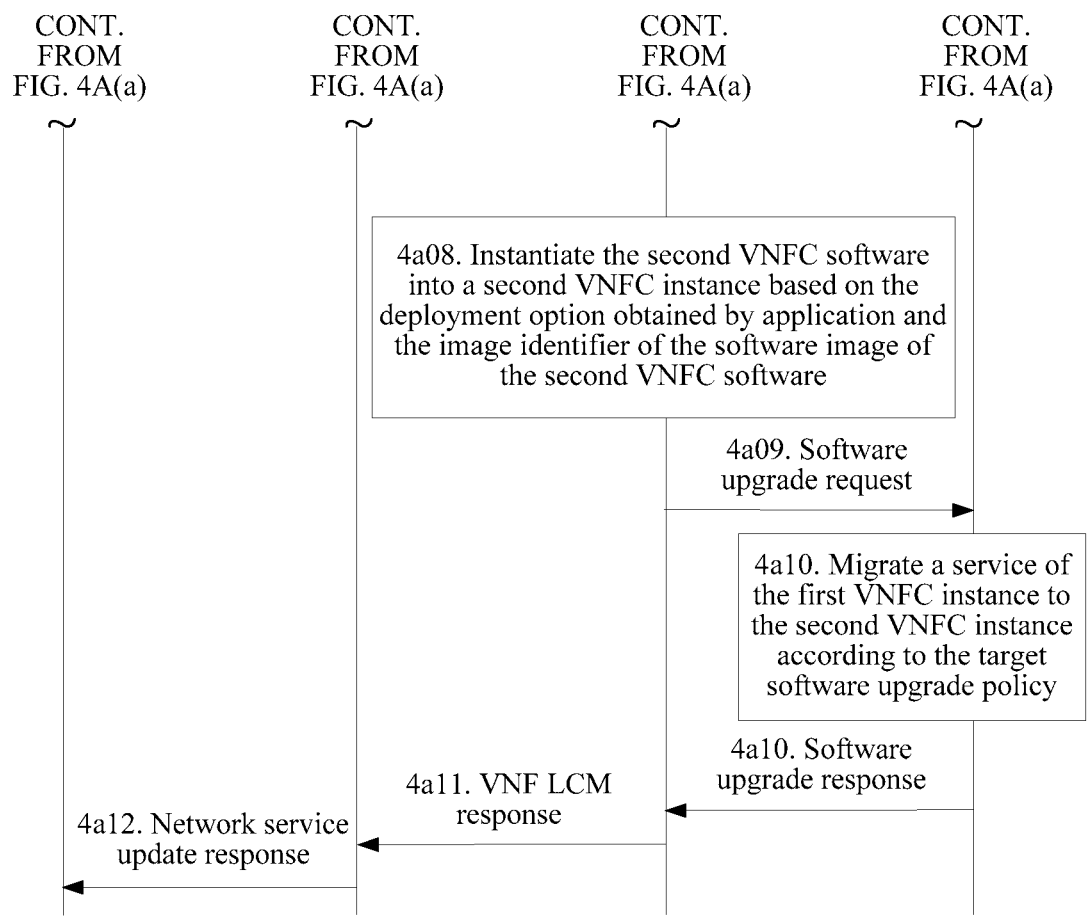

Referring to FIG. 4A (a) and FIG. 4A (b), assuming that the software modification type in the metadata indicates a VNFC software upgrade, the software modification initiation method provided in the embodiments of the present invention indicates a VNFC software upgrade initiation method. The method may include the following steps.

S4a01. An operation support system OSS sends a network service update request (such as an Update NS request) to a network functions virtualization orchestrator NFVO.

For example, the network service update request may include a request type (namely, a VNF software modification) of the network service update request, an instance identifier of a VNF instance of to-be-modified first-version VNF software, a target software upgrade policy, and an identifier of a software package including metadata, where the software package is used for a software modification. A form of expression of VNF software after instantiation is a VNF instance. The VNF instance has a VNF instance identifier. The VNF software has a version identifier.

S4a02. After receiving the network service update request, the NFVO sends a virtualized network function VNF lifecycle management LCM request to a VNFM.

The VNF LCM request includes the instance identifier of the VNF instance of the to-be-modified first-version VNF software, the target software upgrade policy, the identifier of the software package including the metadata, and the like. The target software upgrade policy is a software upgrade policy used to upgrade first VNFC software.

In this example, the VNF LCM request further includes the identifier of the software package. The software package includes the metadata and a VNF descriptor VNFD.

S4a03. The VNFM determines that a type of the VNF LCM request is a software modification operation, and obtains metadata in a software package according to the VNF LCM request.

The metadata includes a version identifier of the first-version VNF software and a software modification type.

In this example, the software modification type in the metadata is a virtualized network function component VNFC software upgrade, and the to-be-modified first-version VNF software includes the first VNFC software.

In this example, the NFV system runs a first VNFC instance. The first VNFC instance is obtained by the NFV system by instantiating the first VNFC software. The metadata further includes an image identifier, used to upgrade the first VNFC software, of a software image of second VNFC software.

In this example, the VNF LCM request includes the identifier of the software package and the target software upgrade policy. The software package includes the metadata and the VNF descriptor VNFD. The metadata further includes an image identifier of a software image of VNFC software and a version identifier of VNF software to which the VNFC software corresponding to the software image belongs.

In a possible example, the metadata includes at least one version identifier of VNF software. The at least one version identifier of VNF software includes the version identifier of the first-version VNF software. The metadata further includes at least one image identifier of a software image of VNFC software of the VNF software, and a version identifier of VNF software to which the VNFC software corresponding to the software image belongs. The metadata further includes at least one image identifier, used to upgrade the VNFC software of the VNF software, of a software image of VNFC software of second-version VNF software, and at least one software upgrade policy. The at least one software upgrade policy includes the target software upgrade policy.

In an example, an implementation of obtaining, by the VNFM according to the VNF LCM request, the metadata, in the software package, used to upgrade the VNFC software can include:

extracting, by the VNFM, the identifier, of the software package, in the VNF LCM request; and obtaining, by the VNFM based on the identifier of the software package, the metadata, in the software package, used to upgrade the VNFC software.

S4a04. The VNFM determines a first VNF instance of first-version VNF software based on a version identifier of the first-version VNF software and an instance identifier of a VNF instance of the to-be-modified first-version VNF software.

In an embodiment, before step S4a04, the VNFM further performs the following operations:

obtaining, by the VNFM based on the instance identifier of the VNF instance of the first-version VNF software, the version identifier of the first-version VNF software from an instance management database; and determining, by the VNFM, that at least one version identifier, in the metadata, of VNF software suitable for being upgraded by using the software package includes the version identifier of the first-version VNF software, and determining that the first-version VNF software is VNF software suitable for being upgraded by using the software package.

S4a05. The VNFM determines an image identifier of a software image of the first VNFC software in the first-version VNF software based on an instance identifier of the first VNF instance, an image identifier of a software image of the VNFC software, and a version identifier of VNF software to which the VNFC software corresponding to the software image belongs.

S4a06. The VNFM determines an instance identifier of the first VNFC instance based on the image identifier of the software image of the first VNFC software.

S4a07. The VNFM determines a resource option and a connection option based on the instance identifier of the first VNFC instance, the VNFD, and the target software upgrade policy, and applies for a deployment option based on the resource option, the connection option, and an image identifier of a software image of the second VNFC software.

In an example, the metadata further includes a mapping relationship between a software upgrade policy and a resource option. A specific implementation of the determining, by the VNFM, a resource option and a connection option based on the instance identifier of the first VNFC instance, the VNFD, and the target software upgrade policy may be: determining, by the VNFM based on the mapping relationship between a software upgrade policy and a resource option that is in the metadata, the resource option corresponding to the target software upgrade policy; and determining the connection option based on the resource option, the instance identifier of the first VNFC instance, and the VNFD.

S4a08. The VNFM instantiates the second VNFC software into a second VNFC instance based on the deployment option obtained by application and the image identifier of the software image of the second VNFC software.

S4a09. The VNFM sends a software upgrade request to an element manager (EM) or a virtualized network function operation and maintenance (VNF O&M) device. The software upgrade request is used to instruct the EM or the VNF O&M device to upgrade the first VNFC instance to the second VNFC instance.

The software upgrade request includes the request type description information (the type of the VNF LCM request is a VNFC software upgrade operation), the instance identifier of the first VNF instance, the instance identifier of the first VNFC instance in the first VNF instance, an instance identifier of the second VNFC instance, and the target software upgrade policy.

S4a10. The EM or the VNF O&M device migrates a service of the first VNFC instance to the second VNFC instance according to the target software upgrade policy, and after the migration is completed, sends a software upgrade response to the VNFM.

The software upgrade response may include the instance identifier of the first VNF instance, the instance identifier of the first VNFC instance in the first VNF instance, and the instance identifier of the second VNFC instance.

S4a11. The VNFM sends a VNF LCM response to the NFVO after receiving the software upgrade response.

For example, the VNF LCM response may include the instance identifier of the first VNF instance.

S4a12. The NFVO sends a network service update response to the OSS after receiving the VNF LCM response.

Figure 4B:
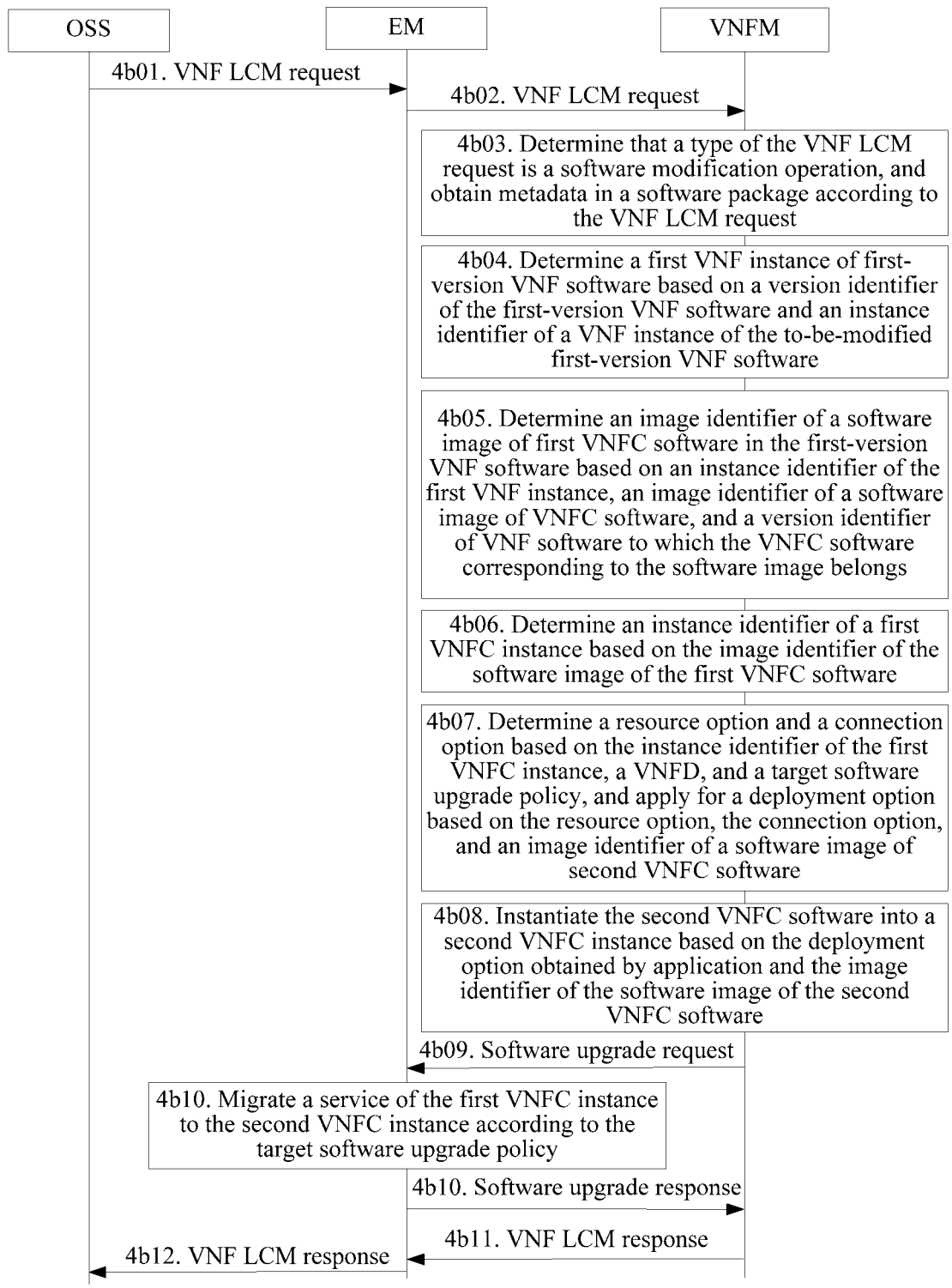
FIG. 4B is a schematic flowchart of another software upgrade initiation method according to an embodiment of the present invention.

Referring to FIG. 4B, assuming that the software modification type in the metadata indicates a VNFC software upgrade, the software modification initiation method provided in the embodiments of the present invention is specifically a VNFC software upgrade initiation method. The method specifically includes the following steps.

S4b01. An operation support system OSS sends a virtualized network function VNF lifecycle management LCM request to an element manager EM.

The VNF LCM request includes an instance identifier of a VNF instance of to-be-modified first-version VNF software, a target software upgrade policy, an identifier of a software package including metadata, and the like. The target software upgrade policy is a software upgrade policy used to upgrade first VNFC software.

In this example, the VNF LCM request further includes the identifier of the software package. The software package includes the metadata and a VNF descriptor VNFD.

S4b02. The EM forwards the VNF LCM request to a VNFM after receiving the VNF LCM request.

S4b03. The VNFM determines that a type of the VNF LCM request is a software modification operation, and obtains metadata in a software package according to the VNF LCM request.

The metadata includes a version identifier of the first-version VNF software and a software modification type.

In this example, the software modification type in the metadata indicates a virtualized network function component VNFC software upgrade, and the to-be-modified first-version VNF software includes the first VNFC software.

In this example, the NFV system runs a first VNFC instance. The first VNFC instance is obtained by the NFV system by instantiating the first VNFC software. The metadata further includes an image identifier, used to upgrade the first VNFC software, of a software image of second VNFC software.

In this example, the VNF LCM request includes the identifier of the software package and the target software upgrade policy. The software package includes the metadata and the VNF descriptor VNFD. The metadata further includes an image identifier of a software image of VNFC software and a version identifier of VNF software to which the VNFC software corresponding to the software image belongs.

In an example, the metadata includes at least one version identifier of VNF software. The at least one version identifier of VNF software includes the version identifier of the first-version VNF software. The metadata further includes at least one image identifier of a software image of VNFC software of the VNF software, and a version identifier of VNF software to which the VNFC software corresponding to the software image belongs. The metadata further includes at least one image identifier, used to upgrade the VNFC software of the VNF software, of a software image of VNFC software of second-version VNF software, and at least one software upgrade policy. The at least one software upgrade policy includes the target software upgrade policy.

In an example, an implementation of obtaining, by the VNFM according to the VNF LCM request, the metadata, in the software package, used to upgrade the VNFC software can include:

extracting, by the VNFM, the identifier, of the software package, in the VNF LCM request; and obtaining, by the VNFM based on the identifier of the software package, the metadata, in the software package, used to upgrade the VNFC software.

S4b04. The VNFM determines a first VNF instance of the first-version VNF software based on a version identifier of the first-version VNF software and an instance identifier of a VNF instance of the to-be-modified first-version VNF software.

In an embodiment, before step S4b04, the VNFM further performs the following operations:

obtaining, by the VNFM based on the instance identifier of the VNF instance of the first-version VNF software, the version identifier of the first-version VNF software from an instance management database; and determining, by the VNFM, that at least one version identifier, in the metadata, of VNF software suitable for being upgraded by using the software package includes the version identifier of the first-version VNF software, and determining that the first-version VNF software is VNF software suitable for being upgraded by using the software package.

S4b05. The VNFM determines an image identifier of a software image of the first VNFC software in the first-version VNF software based on an instance identifier of the first VNF instance, an image identifier of a software image of the VNFC software, and a version identifier of VNF software to which the VNFC software corresponding to the software image belongs.

S4b06. The VNFM determines an instance identifier of the first VNFC instance based on the image identifier of the software image of the first VNFC software.

S4b07. The VNFM determines a resource option and a connection option based on the instance identifier of the first VNFC instance, the VNFD, and the target software upgrade policy, and applies for a deployment option based on the resource option, the connection option, and an image identifier of a software image of the second VNFC software.

In an example, the metadata further includes a mapping relationship between a software upgrade policy and a resource option. A specific implementation of the determining, by the VNFM, a resource option and a connection option based on the instance identifier of the first VNFC instance, the VNFD, and the target software upgrade policy may be: determining, by the VNFM based on the mapping relationship between a software upgrade policy and a resource option that is in the metadata, the resource option corresponding to the target software upgrade policy; and determining the connection option based on the resource option, the instance identifier of the first VNFC instance, and the VNFD.

S4b08. The VNFM instantiates the second VNFC software into a second VNFC instance based on the deployment option obtained by application and the image identifier of the software image of the second VNFC software.

S4b09. The VNFM sends a software upgrade request to the EM, where the software upgrade request is used to instruct the EM to upgrade the first VNFC instance to the second VNFC instance.

The software upgrade request includes the request type description information (the type of the VNF LCM request is a VNFC software upgrade operation), the instance identifier of the first VNF instance, the instance identifier of the first VNFC instance in the first VNF instance, an instance identifier of the second VNFC instance, and the target software upgrade policy.

S4b10. The EM migrates a service of the first VNFC instance to the second VNFC instance according to the target software upgrade policy, and after the migration is completed, sends a software upgrade response to the VNFM.

The software upgrade response may include the instance identifier of the first VNF instance, the instance identifier of the first VNFC instance in the first VNF instance, and the instance identifier of the second VNFC instance.

S4b11. The VNFM sends a VNF LCM response to the EM after receiving the software upgrade response.

For example, the VNF LCM response may include the instance identifier of the first VNF instance.

S4b12. The EM forwards the VNF LCM response to the OSS after receiving the VNF LCM response.

Figure 4C:
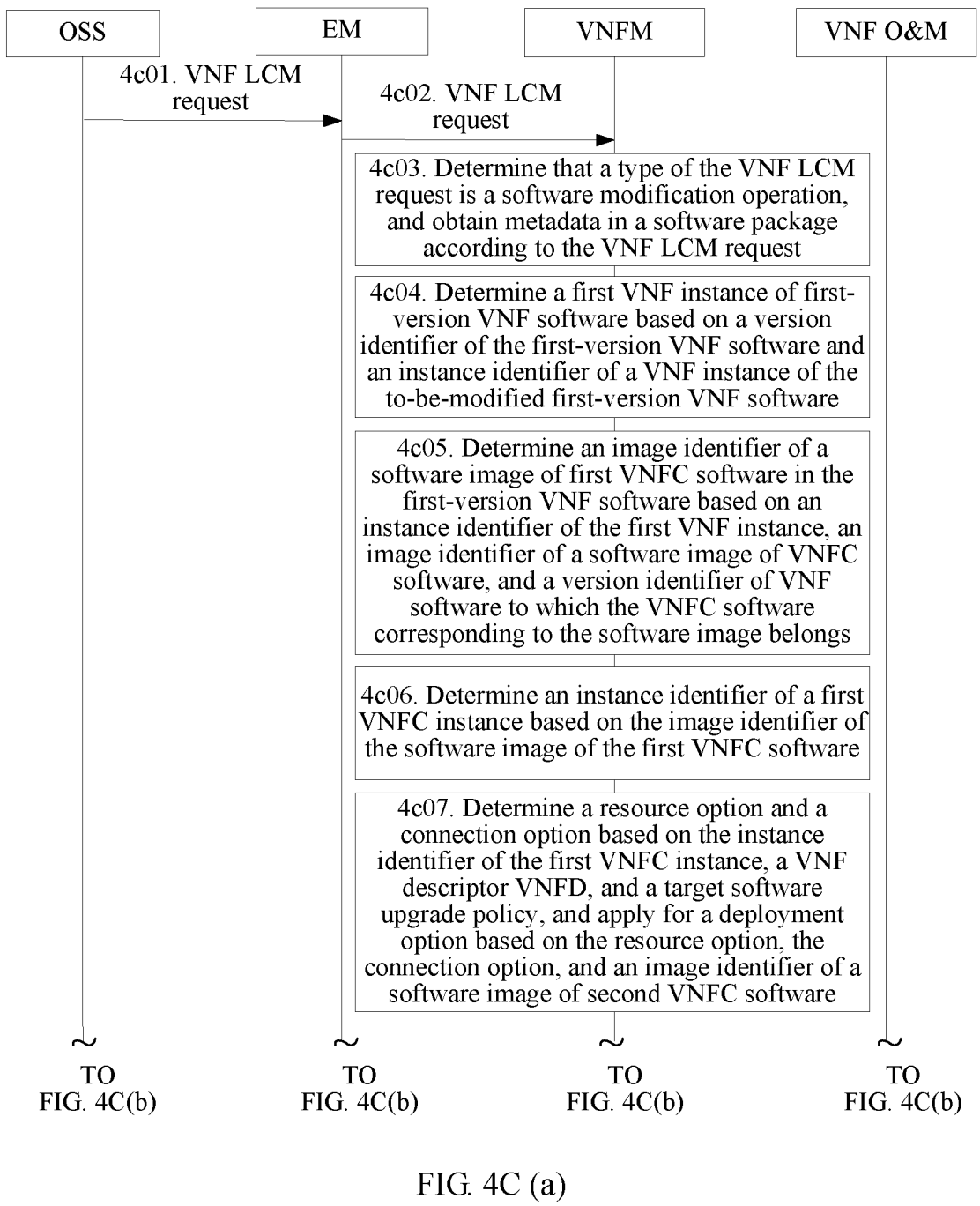
FIG. 4C (a) and FIG. 4C (b) are a schematic flowchart of another software upgrade initiation method according to an embodiment of the present invention.
Figure 4C:
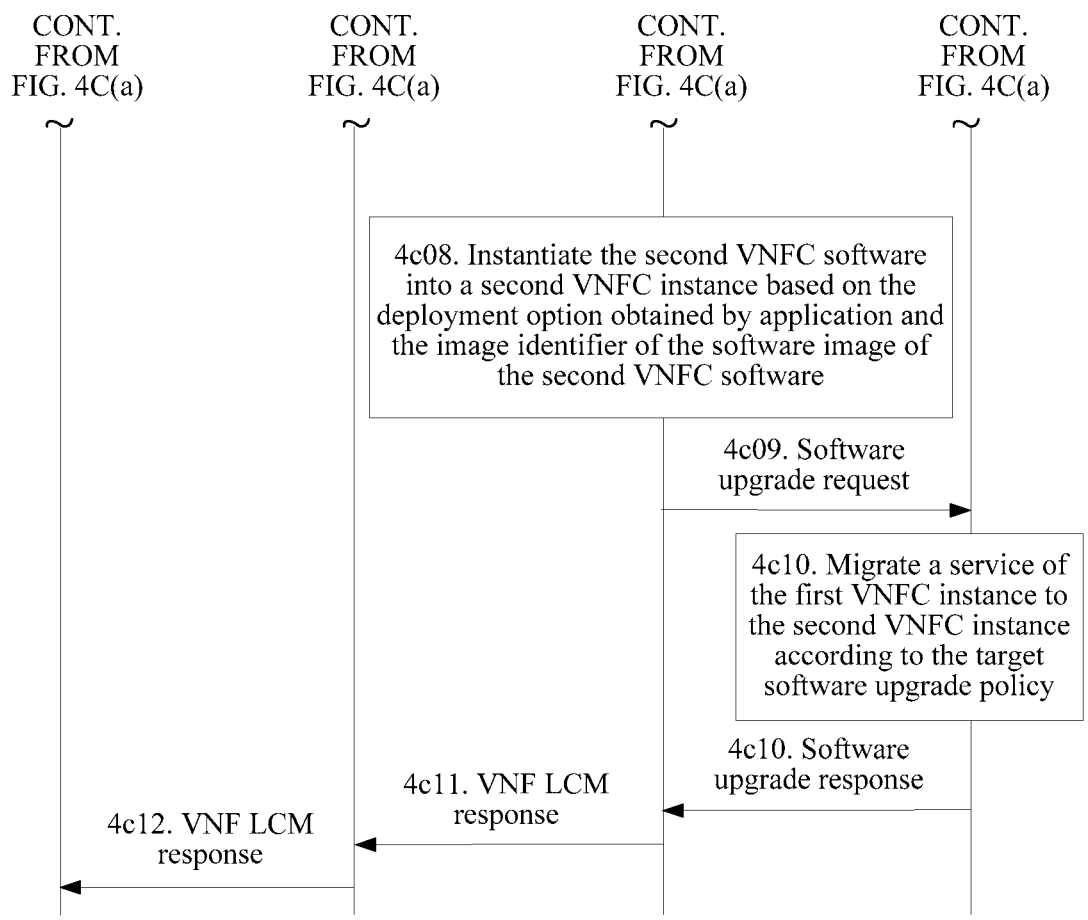

Referring to FIG. 4C (a) and FIG. 4C (b), assuming that the software modification type in the metadata is a VNFC software upgrade, the software modification initiation method provided in the embodiments of the present invention is specifically a VNFC software upgrade initiation method. The method specifically includes the following steps.

S4c01. An operation support system OSS sends a virtualized network function VNF lifecycle management LCM request to an element manager EM.

The VNF LCM request includes an instance identifier of a VNF instance of to-be-modified first-version VNF software, a target software upgrade policy, an identifier of a software package including metadata, and the like. The target software upgrade policy is a software upgrade policy used to upgrade first VNFC software.

In this example, the VNF LCM request further includes the identifier of the software package. The software package includes the metadata and a VNF descriptor VNFD.

S4c02. The EM forwards the VNF LCM request to a VNFM after receiving the VNF LCM request.

S4c03. The VNFM determines that a type of the VNF LCM request is a software modification operation, and obtains metadata in a software package according to the VNF LCM request.

The metadata includes a version identifier of the first-version VNF software and a software modification type.

In this example, the software modification type in the metadata indicates a virtualized network function component VNFC software upgrade, and the to-be-modified first-version VNF software includes the first VNFC software.

In this example, the NFV system runs a first VNFC instance. The first VNFC instance is obtained by the NFV system by instantiating the first VNFC software. The metadata further includes an image identifier, used to upgrade the first VNFC software, of a software image of second VNFC software.

In this example, the VNF LCM request includes the identifier of the software package and the target software upgrade policy. The software package includes the metadata and the VNF descriptor VNFD. The metadata further includes an image identifier of a software image of VNFC software and a version identifier of VNF software to which the VNFC software corresponding to the software image belongs.

In an example, the metadata includes at least one version identifier of VNF software. The at least one version identifier of VNF software includes the version identifier of the first-version VNF software. The metadata further includes at least one image identifier of a software image of VNFC software of the VNF software, and a version identifier of VNF software to which the VNFC software corresponding to the software image belongs. The metadata further includes at least one image identifier, used to upgrade the VNFC software of the VNF software, of a software image of VNFC software of second-version VNF software, and at least one software upgrade policy. The at least one software upgrade policy includes the target software upgrade policy.

In an example, obtaining, by the VNFM according to the VNF LCM request, the metadata, in the software package, used to upgrade the VNFC software can include:

extracting, by the VNFM, the identifier of the software package, in the VNF LCM request; and obtaining, by the VNFM based on the identifier of the software package, the metadata, in the software package, used to upgrade the VNFC software.

S4c04. The VNFM determines a first VNF instance of the first-version VNF software based on a version identifier of the first-version VNF software and an instance identifier of a VNF instance of the to-be-modified first-version VNF software.

In an embodiment, before step S4c04, the VNFM further performs the following operations:

obtaining, by the VNFM based on the instance identifier of the VNF instance of the first-version VNF software, the version identifier of the first-version VNF software from an instance management database; and determining, by the VNFM, that at least one version identifier, in the metadata, of VNF software suitable for being upgraded by using the software package includes the version identifier of the first-version VNF software, and determining that the first-version VNF software is VNF software suitable for being upgraded by using the software package.

S4c05. The VNFM determines an image identifier of a software image of the first VNFC software in the first-version VNF software based on an instance identifier of the first VNF instance, an image identifier of a software image of the VNFC software, and a version identifier of VNF software to which the VNFC software corresponding to the software image belongs.

S4c06. The VNFM determines an instance identifier of the first VNFC instance based on the image identifier of the software image of the first VNFC software.

S4c07. The VNFM determines a resource option and a connection option based on the instance identifier of the first VNFC instance, a VNF descriptor VNFD, and the target software upgrade policy, and applies for a deployment option based on the resource option, the connection option, and an image identifier of a software image of the second VNFC software.

In an example, the metadata further includes a mapping relationship between a software upgrade policy and a resource option. An implementation of the determining, by the VNFM, a resource option and a connection option based on the instance identifier of the first VNFC instance, the VNFD, and the target software upgrade policy may include: determining, by the VNFM based on the mapping relationship between a software upgrade policy and a resource option that is in the metadata, the resource option corresponding to the target software upgrade policy; and determining the connection option based on the resource option, the instance identifier of the first VNFC instance, and the VNFD.

S4c08. The VNFM instantiates the second VNFC software into a second VNFC instance based on the deployment option obtained by application and the image identifier of the software image of the second VNFC software.

S4c09. The VNFM sends a software upgrade request to a virtualized network function operation and maintenance VNF O&M device, where the software upgrade request is used to instruct the VNF O&M device to upgrade the first VNFC instance to the second VNFC instance.

The software upgrade request includes the request type description information (the type of the VNF LCM request is a VNFC software upgrade operation), the instance identifier of the first VNF instance, the instance identifier of the first VNFC instance in the first VNF instance, an instance identifier of the second VNFC instance, and the target software upgrade policy.

S4c10. The VNF O&M device migrates a service of the first VNFC instance to the second VNFC instance according to the target software upgrade policy, and after the migration is completed, sends a software upgrade response to the VNFM.

The software upgrade response may include the instance identifier of the first VNF instance, the instance identifier of the first VNFC instance in the first VNF instance, and the instance identifier of the second VNFC instance.

S4c11. The VNFM sends a VNF LCM response to the EM after receiving the software upgrade response.

For example, the VNF LCM response may include the instance identifier of the first VNF instance.

S4c12. The EM sends the VNF LCM response to the OSS after receiving the VNF LCM response.

Figure 4D:
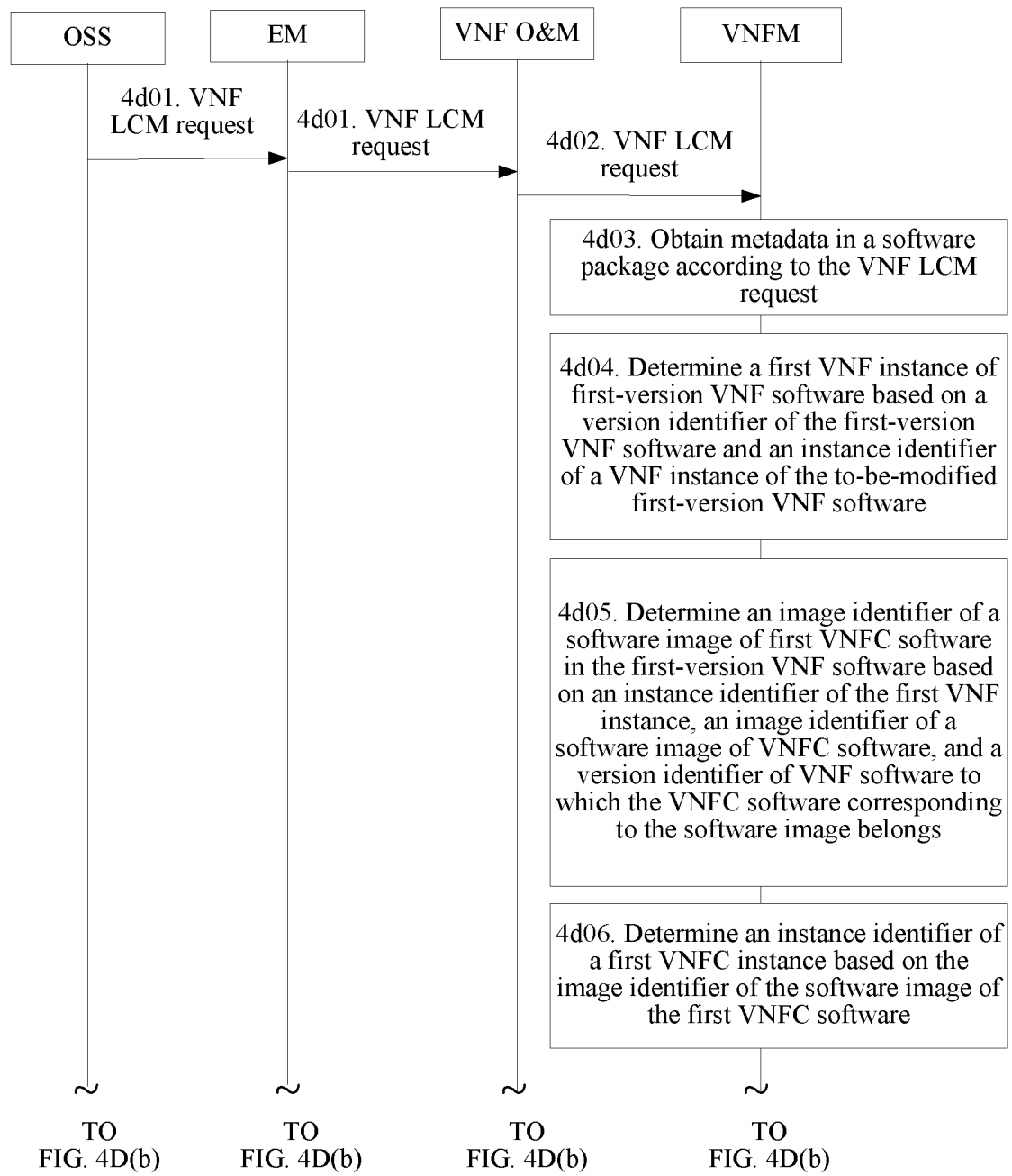
FIG. 4D (a) and FIG. 4D (b) are a schematic flowchart of another software upgrade initiation method according to an embodiment of the present invention.
Figure 4D:
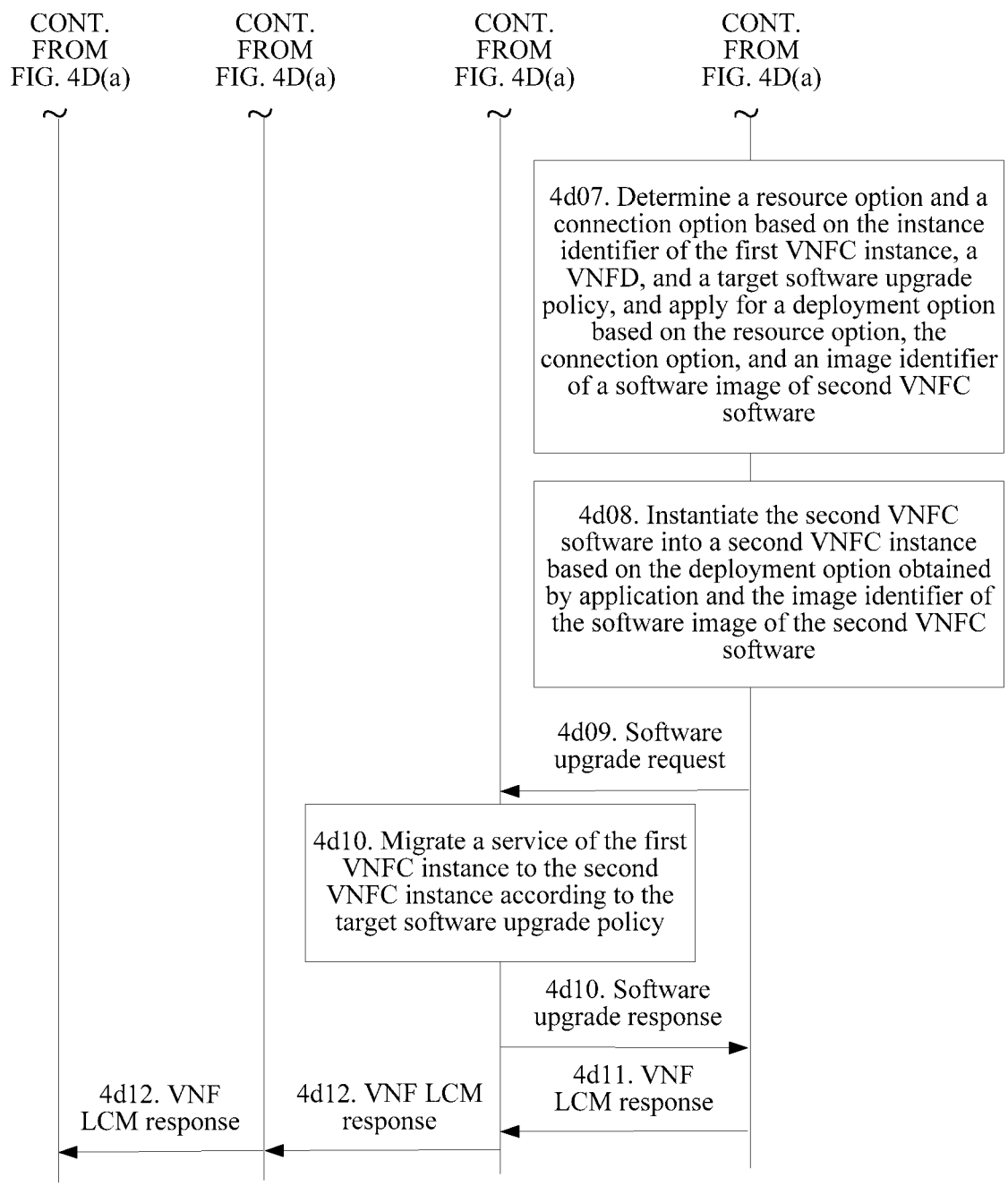

Referring to FIG. 4D (a) and FIG. 4D (b), assuming that the software modification type in the metadata is a VNFC software upgrade, the software modification initiation method provided in the embodiments of the present invention is specifically a VNFC software upgrade initiation method. The method specifically includes the following steps.

S4d01. An operation support system OSS sends a virtualized network function VNF lifecycle management LCM request to a virtualized network function operation and maintenance VNF O&M device by using an element manager EM.

The VNF LCM request includes an instance identifier of a VNF instance of to-be-modified first-version VNF software, a target software upgrade policy, an identifier of a software package including metadata, and the like. The target software upgrade policy is a software upgrade policy used to upgrade first VNFC software.

In this example, the VNF LCM request further includes the identifier of the software package. The software package includes the metadata and a VNF descriptor VNFD.

S4d02. The VNF O&M device forwards the VNF LCM request to a VNFM after receiving the VNF LCM request.

S4d03. The VNFM determines that a type of the VNF LCM request is a software modification operation, and obtains metadata in a software package according to the VNF LCM request.

The metadata includes a version identifier of the first-version VNF software and a software modification type.

In this example, the software modification type in the metadata is a virtualized network function component VNFC software upgrade, and the to-be-modified first-version VNF software includes the first VNFC software.

In this example, the NFV system runs a first VNFC instance. The first VNFC instance is obtained by the NFV system by instantiating the first VNFC software. The metadata further includes an image identifier, used to upgrade the first VNFC software, of a software image of second VNFC software.

In this example, the VNF LCM request includes the identifier of the software package and the target software upgrade policy. The software package includes the metadata and the VNF descriptor VNFD. The metadata further includes an image identifier of a software image of VNFC software and a version identifier of VNF software to which the VNFC software corresponding to the software image belongs.

In an example, the metadata includes at least one version identifier of VNF software. The at least one version identifier of VNF software includes the version identifier of the first-version VNF software. The metadata further includes at least one image identifier of a software image of VNFC software of the VNF software, and a version identifier of VNF software to which the VNFC software corresponding to the software image belongs. The metadata further includes at least one image identifier, used to upgrade the VNFC software of the VNF software, of a software image of VNFC software of second-version VNF software, and at least one software upgrade policy. The at least one software upgrade policy includes the target software upgrade policy.

In an example, a specific implementation of obtaining, by the VNFM according to the VNF LCM request, the metadata, in the software package, used to upgrade the VNFC software is:

extracting, by the VNFM, the identifier, of the software package, in the VNF LCM request; and obtaining, by the VNFM based on the identifier of the software package, the metadata, in the software package, used to upgrade the VNFC software.

S4d04. The VNFM determines a first VNF instance of the first-version VNF software based on a version identifier of the first-version VNF software and an instance identifier of a VNF instance of the to-be-modified first-version VNF software.

In an embodiment, before step S4d04, the VNFM further performs the following operations:

obtaining, by the VNFM based on the instance identifier of the VNF instance of the first-version VNF software, the version identifier of the first-version VNF software from an instance management database; and determining, by the VNFM, that at least one version identifier, in the metadata, of VNF software suitable for being upgraded by using the software package includes the version identifier of the first-version VNF software, and determining that the first-version VNF software is VNF software suitable for being upgraded by using the software package.

S4d05. The VNFM determines an image identifier of a software image of the first VNFC software in the first-version VNF software based on an instance identifier of the first VNF instance, an image identifier of a software image of the VNFC software, and a version identifier of VNF software to which the VNFC software corresponding to the software image belongs.

S4d06. The VNFM determines an instance identifier of the first VNFC instance based on the image identifier of the software image of the first VNFC software.

In a possible example, the metadata further includes a mapping relationship between a software upgrade policy and a resource option. A specific implementation of determining, by the VNFM, a resource option and a connection option based on the instance identifier of the first VNFC instance, the VNFD, and the target software upgrade policy may be: determining, by the VNFM based on the mapping relationship between a software upgrade policy and a resource option that is in the metadata, the resource option corresponding to the target software upgrade policy; and determining the connection option based on the resource option, the instance identifier of the first VNFC instance, and the VNFD.

S4d07. The VNFM determines a resource option and a connection option based on the instance identifier of the first VNFC instance, the VNFD, and the target software upgrade policy, and applies for a deployment option based on the resource option, the connection option, and an image identifier of a software image of the second VNFC software.

S4d08. The VNFM instantiates the second VNFC software into a second VNFC instance based on the deployment option obtained by application and the image identifier of the software image of the second VNFC software.

S4d09. The VNFM sends a software upgrade request to the VNF O&M device, where the software upgrade request is used to instruct the VNF O&M device to upgrade the first VNFC instance to the second VNFC instance.

The software upgrade request includes the request type description information (the type of the VNF LCM request indicates a VNFC software upgrade operation), the instance identifier of the first VNF instance, the instance identifier of the first VNFC instance in the first VNF instance, an instance identifier of the second VNFC instance, and the target software upgrade policy.

S4d10. The VNF O&M device migrates a service of the first VNFC instance to the second VNFC instance according to the target software upgrade policy, and after the migration is completed, sends a software upgrade response to the VNFM.

The software upgrade response may include the instance identifier of the first VNF instance, the instance identifier of the first VNFC instance in the first VNF instance, and the instance identifier of the second VNFC instance.

S4d11. The VNFM sends a VNF LCM response to the VNF O&M device after receiving the software upgrade response.

For example, the VNF LCM response may include the instance identifier of the first VNF instance.

S4d12. The VNF O&M device forwards the VNF LCM response to the OSS by using the EM after receiving the VNF LCM response.

Figure 4E:
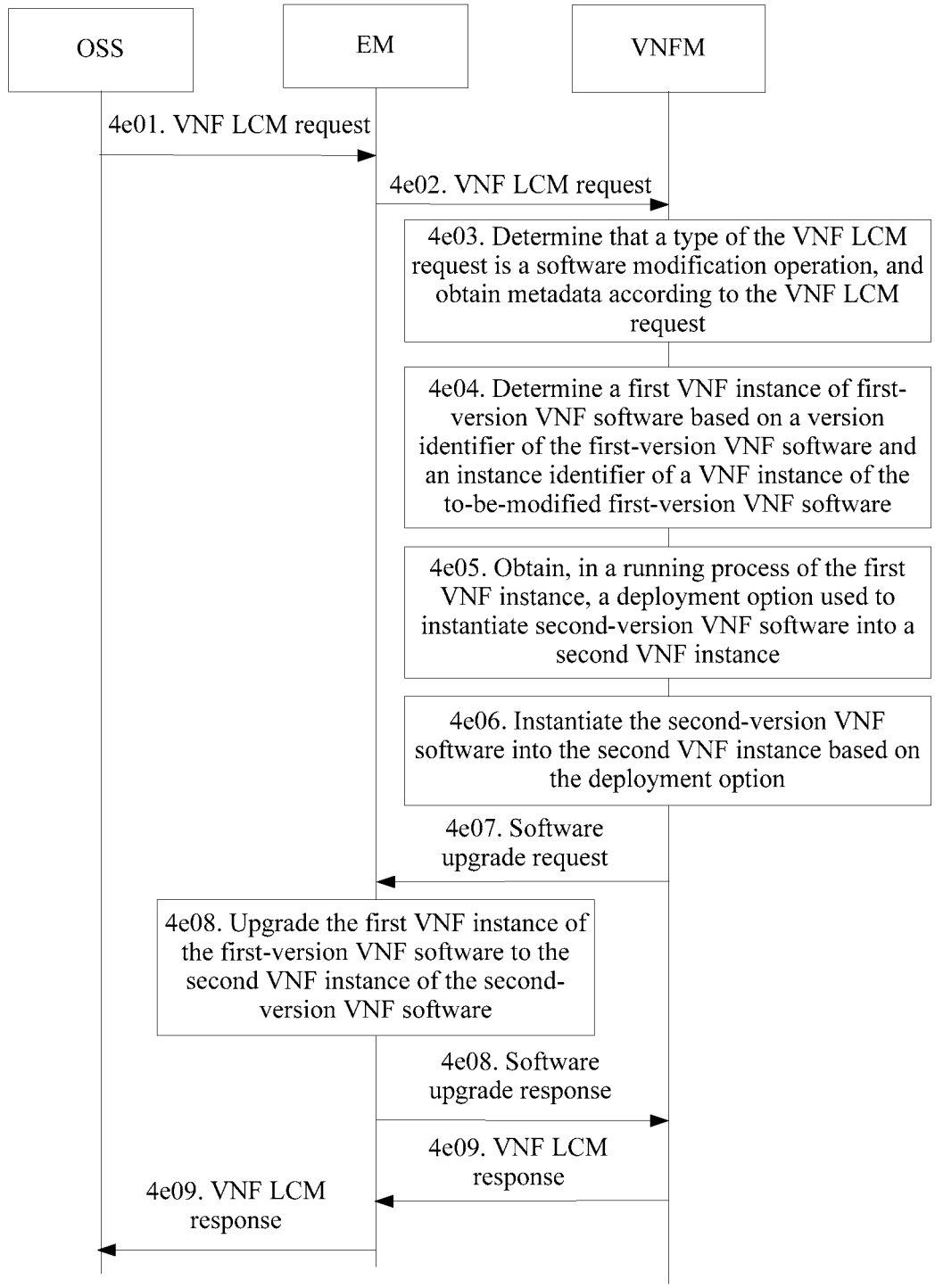
FIG. 4E is a schematic flowchart of another software upgrade initiation method according to an embodiment of the present invention.

Referring to FIG. 4E, assuming that the software modification type in the metadata is a VNF software upgrade, the software modification initiation method provided in the embodiments of the present invention is specifically a software upgrade initiation method. The method specifically includes the following steps.

S4e01. An operation support system OSS sends a virtualized network function VNF lifecycle management LCM request to an element manager EM.

S4e02. After receiving the network service update request, the EM sends the VNF LCM request to a VNFM, where the VNF LCM request includes an instance identifier of a VNF instance of to-be-upgraded first-version VNF software.

S4e03. The VNFM determines that a type of the VNF LCM request is a software modification operation, and obtains metadata according to the VNF LCM request, where the metadata includes a version identifier of the first-version VNF software and a software modification type.

A specific implementation of the obtaining, by the VNFM, metadata according to the VNF LCM request is:

extracting, by the VNFM, an identifier, of a software package, in the VNF LCM request; and obtaining, by the VNFM, the metadata in the software package based on the identifier of the software package.

S4e04. The VNFM determines a first VNF instance of the first-version VNF software based on the version identifier of the first-version VNF software and the instance identifier of the VNF instance of the to-be-modified first-version VNF software.

S4e05. The VNFM obtains, in a running process of the first VNF instance, a deployment option used to instantiate second-version VNF software into a second VNF instance.

S4e06. The VNFM instantiates the second-version VNF software into the second VNF instance based on the deployment option.

S4e07. The VNFM sends a software upgrade request to the element manager EM, where the software upgrade request is used to instruct the EM to upgrade the first VNF instance of the first-version VNF software to the second VNF instance of the second-version VNF software.

For example, the software upgrade request may include the following information: an instance identifier of the first VNF instance, an instance identifier of the second VNF instance, the version identifier of the first-version VNF software, a version identifier of the second-version VNF software, and the target software upgrade policy.

S4e08. The EM upgrades the first VNF instance of the first-version VNF software to the second VNF instance of the second-version VNF software, and sends a software upgrade response to the VNFM.

For example, the software upgrade response may include the version identifier of the first-version VNF software, the version identifier of the second-version VNF software, the instance identifier of the first VNF instance that is upgraded, and the instance identifier of the second VNF instance that is obtained after the upgrade.

S4e09. The VNFM sends a VNF LCM response to the EM after receiving the software upgrade response.

For example, the VNF LCM response may include the instance identifier of the first VNF instance that is upgraded and the instance identifier of the second VNF instance that is obtained after the upgrade.

S4e10. The EM sends the VNF LCM response to the OSS after receiving the VNF LCM response.

For example, the VNF LCM response may include the instance identifier of the first VNF instance that is upgraded and the instance identifier of the second VNF instance that is obtained after the upgrade.

Figure 5:
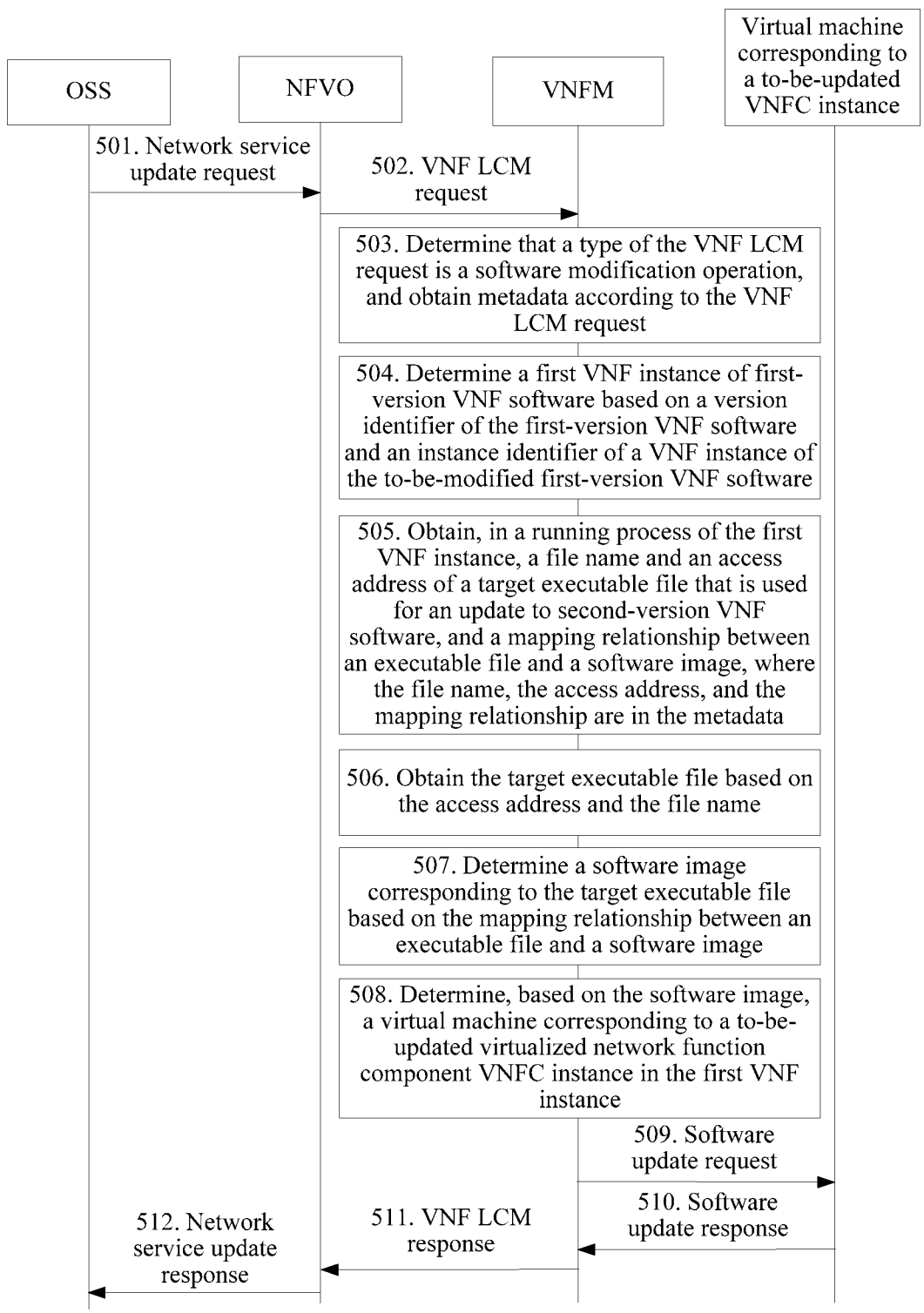
FIG. 5 is a schematic flowchart of a software update initiation method according to an embodiment of the present invention.

Referring to FIG. 5, assuming that the software modification type in the metadata is a VNF software update, the software modification initiation method provided in the embodiments of the present invention is specifically a software update initiation method. The method specifically includes the following steps.

S501. An operation support system OSS sends a network service update request (such as an Update NS request) to a network functions virtualization orchestrator NFVO.

For example, the network service update request may include an instance identifier of a network service instance, a type of the network service update request, an instance identifier of a VNF instance of to-be-modified first-version VNF software, and an identifier of a software package including metadata.

S502. After receiving the network service update request, the NFVO sends a virtualized network function VNF lifecycle management LCM request to a VNFM, where the VNF LCM request includes an instance identifier of a VNF instance of to-be-updated first-version VNF software.

S503. The VNFM determines that a type of the VNF LCM request is a software modification operation, and obtains metadata according to the VNF LCM request, where the metadata includes a version identifier of the first-version VNF software and a software modification type.

An implementation of the obtaining, by the VNFM, metadata according to the VNF LCM request is:

extracting, by the VNFM, the identifier, of the software package, in the VNF LCM request; and obtaining, by the VNFM, the metadata in the software package based on the identifier of the software package.

S504. The VNFM determines a first VNF instance of the first-version VNF software based on the version identifier of the first-version VNF software and the instance identifier of the VNF instance of the to-be-modified first-version VNF software.

S505. The VNFM obtains, in a running process of the first VNF instance, a file name and an access address of a target executable file that is used for an update to a second VNF instance of the second-version VNF software, and a mapping relationship between an executable file and a software image, where the file name, the access address, and the mapping relationship are in the metadata, and an instance identifier of the first VNF instance is consistent with an instance identifier of the second VNF instance.

The software image is a software image of VNFC software of to-be-updated VNF software. The target executable file is an executable file corresponding to the software image used to update the VNFC software of the to-be-updated VNF. The mapping relationship includes an executable file name, an image identifier of a software image, and a correspondence between the executable file name and the software image identifier. The metadata includes at least one version identifier of VNF software. The at least one version identifier of VNF software includes the version identifier of the first-version VNF software. The metadata further includes at least one image identifier of a software image of VNFC software of the VNF software, and a version identifier of VNF software to which the VNFC software corresponding to the software image belongs. The image identifier of the software image of the VNFC software includes an image identifier of a software image corresponding to the target executable file.

S506. The VNFM obtains the target executable file based on the access address and the file name.

S507. The VNFM determines, based on the mapping relationship between an executable file and a software image, a software image corresponding to the target executable file.

A form of expression of the software image corresponding to the target executable file is a software image identifier.

S508. The VNFM determines, based on the software image, a virtual machine corresponding to a to-be-updated virtualized network function component VNFC instance in the first VNF instance.

S509. The VNFM sends a software update request to the virtual machine corresponding to the to-be-updated VNFC instance, where the software update request is used to instruct the virtual machine to run the executable file to update the VNFC instance.

For example, the software update request may include the instance identifier of the first VNF instance, an instance identifier of the VNFC instance, the version identifier of the first-version VNF software, and a version identifier of the second-version VNF software.

S510. The virtual machine sends a software update response to the VNFM.

For example, the software upgrade response may include the version identifier of the first-version VNF software, the version identifier of the second-version VNF software, the instance identifier of the first VNF instance that is updated, and the instance identifier of the second VNF instance that is obtained after the update.

S511. The VNFM sends a VNF LCM response to the NFVO.

For example, the VNF LCM response may include the instance identifier of the first VNF instance that is updated and the instance identifier of the second VNF instance that is obtained after the update.

S512. The NFVO sends a network service update response to the OSS after receiving the VNF LCM response.

For example, the network service update response may include the instance identifier of the first VNF instance that is updated and the instance identifier of the second VNF instance that is obtained after the update.

Figure 5A:
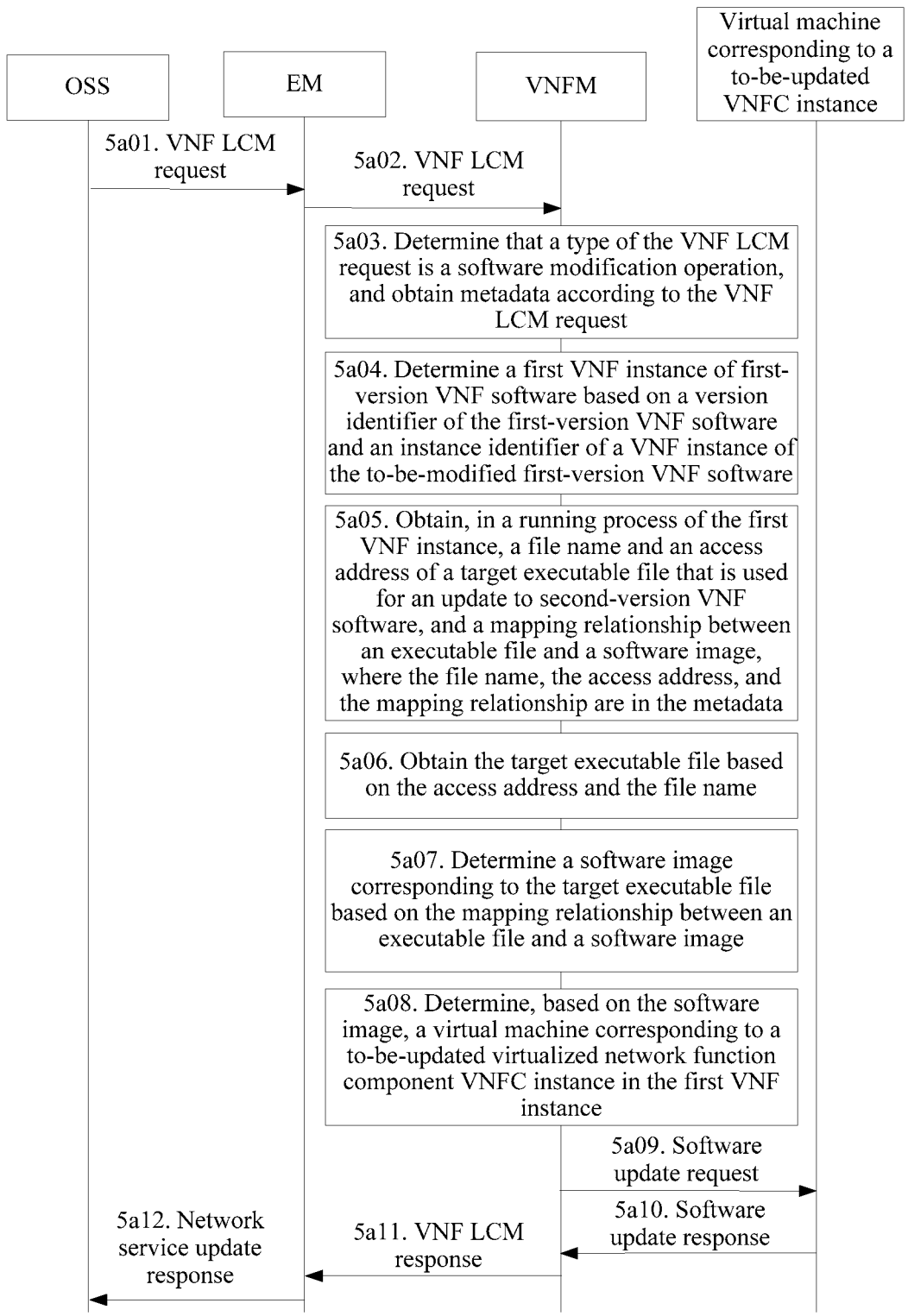
FIG. 5A is a schematic flowchart of another software update initiation method according to an embodiment of the present invention.

Referring to FIG. 5A, assuming that the software modification type in the metadata is a VNF software update, the software modification initiation method provided in the embodiments of the present invention is specifically a software update initiation method. The method specifically includes the following steps.

S5a01. An operation support system OSS sends a virtualized network function VNF lifecycle management LCM request to an element manager EM.

S5a02. The EM forwards the VNF LCM request to a VNFM after receiving the VNF LCM request, where the VNF LCM request includes an instance identifier of a VNF instance of to-be-updated first-version VNF software.

S5a03. The VNFM determines that a type of the VNF LCM request is a software modification operation, and obtains metadata according to the VNF LCM request, where the metadata includes a version identifier of the first-version VNF software and a software modification type.

An implementation of the obtaining, by the VNFM, metadata according to the VNF LCM request may include:

extracting, by the VNFM, an identifier, of a software package, in the VNF LCM request; and obtaining, by the VNFM, the metadata in the software package based on the identifier of the software package.

S5a04. The VNFM determines a first VNF instance of the first-version VNF software based on the version identifier of the first-version VNF software and the instance identifier of the VNF instance of the to-be-modified first-version VNF software.

S5a05. The VNFM obtains, in a running process of the first VNF instance, a file name and an access address of a target executable file that is used for an update to a second VNF instance of the second-version VNF software, and a mapping relationship between an executable file and a software image, where the file name, the access address, and the mapping relationship are in the metadata, and an instance identifier of the first VNF instance is consistent with an instance identifier of the second VNF instance.

The software image is a software image of VNFC software of to-be-updated VNF software. The target executable file is an executable file corresponding to the software image used to update the VNFC software of the to-be-updated VNF. The mapping relationship includes an executable file name, an image identifier of a software image, and a correspondence between the executable file name and the software image identifier. The metadata includes at least one version identifier of VNF software. The at least one version identifier of VNF software includes the version identifier of the first-version VNF software. The metadata further includes at least one image identifier of a software image of VNFC software of the VNF software, and a version identifier of VNF software to which the VNFC software corresponding to the software image belongs. The image identifier of the software image of the VNFC software includes an image identifier of a software image corresponding to the target executable file.

S5a06. The VNFM obtains the target executable file based on the access address and the file name.

S5a07. The VNFM determines, based on the mapping relationship between an executable file and a software image, an image identifier of a software image corresponding to the target executable file.

S5a08. The VNFM determines, based on the image identifier of the software image, a virtual machine corresponding to a to-be-updated virtualized network function component VNFC instance in the first VNF instance.

S5a09. The VNFM sends a software update request to the virtual machine corresponding to the to-be-updated VNFC instance, where the software update request is used to instruct the virtual machine to run the executable file to update the VNFC instance.

For example, the software update request may include the instance identifier of the first VNF instance, an instance identifier of the VNFC instance, the version identifier of the first-version VNF software, and a version identifier of the second-version VNF software.

S5a10. The virtual machine sends a software update response to the VNFM.

For example, the software upgrade response may include the version identifier of the first-version VNF software, the version identifier of the second-version VNF software, the instance identifier of the first VNF instance that is updated, and the instance identifier of the second VNF instance that is obtained after the update.

S5a11. The VNFM sends a VNF LCM response to the EM.

For example, the VNF LCM response may include the instance identifier of the first VNF instance that is updated and the instance identifier of the second VNF instance that is obtained after the update.

S5a12. The EM sends a network service update response to the OSS after receiving the VNF LCM response.

For example, the network service update response may include the instance identifier of the first VNF instance that is updated and the instance identifier of the second VNF instance that is obtained after the update.

The foregoing describes the solutions of the embodiments of the present invention mainly from a perspective of execution processes of the metadata release apparatus and the VNFM that is in the NFV system. It may be understood that, to implement the foregoing functions, the metadata release apparatus and the VNFM include corresponding hardware structures and/or software modules for executing the functions. A person of ordinary skill in the art may be easily aware that, units and algorithm steps of the examples described in combination with the embodiments disclosed in this specification may be implemented by hardware, or a combination of hardware and computer software in the present invention. Whether a function is executed by the hardware or by the computer software driving the hardware depends on particular applications and design constraint conditions of the technical solutions. A person skilled in the art may use different methods to implement the described functions for each particular application, but it should not be considered that the implementation goes beyond the scope of this application.

In the embodiments of the present invention, functional units of the metadata release apparatus and the VNFM may be divided according to the foregoing examples of the methods. For example, the functional units may be divided based on the functions, or two or more functions may be integrated in one processing unit. The integrated unit may be implemented in a form of hardware, or may be implemented in a form of a software functional unit. In addition, the unit division in the embodiments of the present invention is an example, is merely logical function division, and may be other division in actual implementation.

Figure 6A:
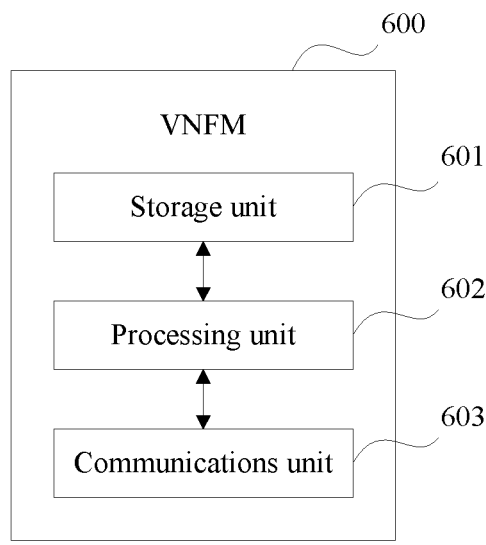
FIG. 6A is a block diagram of functional units of a VNFM according to an embodiment of the present invention.

When the integrated unit is used, FIG. 6A shows a possible schematic structural diagram of the VNFM included in the foregoing embodiments. The VNFM 600 includes a processing unit 602 and a communications unit 603. The processing unit 602 is configured to control and manage an action of the VNFM. For example, the processing unit 602 is configured to support the VNFM to perform steps S202 to S204 in FIG. 2, steps S403 to S407 and S409 in FIG. 4, steps S4a03 to S4a09 and S4a11 in FIG. 4A (a) and FIG. 4A (b), steps S4b03 to S4b09 and S4b11 in FIG. 4B, steps S4bc03 to S4c09 and S4c11 in FIG. 4C (a) and FIG. 4C (b), steps S4dc03 to S4d09 and S4d11 in FIG. 4D (a) and FIG. 4D (b), steps S4ec03 to S4e07 and S4e09 in FIG. 4E, steps S503 to S509 and S511 in FIG. 5, and steps S5a03 to S5a09 and S5a11 in FIG. 5A; and/or is configured to perform another process of the technologies described in this specification. The communications unit 603 is configured to support communication between the VNFM and a metadata release apparatus or another network element in an NFV system, for example, communication between the VNFM and an NFVO in the NFV system. The VNFM may further include a storage unit 601, configured to store program code and data of the VNFM.

The processing unit 602 may be a processor or a controller. For example, the processing unit 602 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware device, or any combination thereof. The processing unit 602 may implement or execute the logical block diagrams, modules, and circuits of the examples described in combination with the content disclosed in the present invention. The processor may alternatively be a combination that implements a computing function. For example, the processor may include a combination of one or more microprocessors, or a combination of a DSP and a microprocessor. The communications unit 603 may be a communications interface, a transceiver, a transceiver circuit, or the like. The communications interface is a collective name, and may include one or more interfaces. The storage unit 601 may be a memory.

Figure 6B:
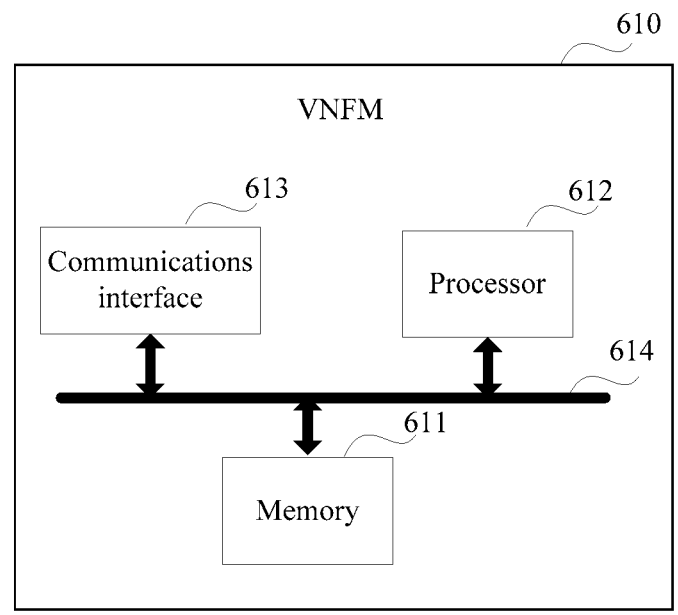
FIG. 6B is a schematic structural diagram of a VNFM according to an embodiment of the present invention.

When the processing unit 602 is a processor, the communications unit 603 is a communications interface, and the storage unit 601 is a memory, the VNFM included in the embodiments of the present invention may be a VNFM shown in FIG. 6B.

Referring to FIG. 6B, the VNFM 610 includes a processor 612, a communications interface 613, and a memory 611. Optionally, the VNFM 610 may further include a bus 614. The communications interface 613, the processor 612, and the memory 611 may be connected to each other by using the bus 614. The bus 614 may be a Peripheral Component Interconnect (Peripheral Component Interconnect, PCI for short) bus, an extended industry standard architecture (Extended Industry Standard Architecture, EISA for short) bus, or the like. The bus 614 may be classified into an address bus, a data bus, a control bus, and the like. For ease of representation, the bus 614 is represented by using only one bold line in FIG. 6B. However, it does not mean that there is only one bus or one type of bus.

The VNFM shown in FIG. 6A or FIG. 6B may also be understood as an apparatus used for a VNFM. This is not limited in the embodiments of the present invention.

Figure 7A:
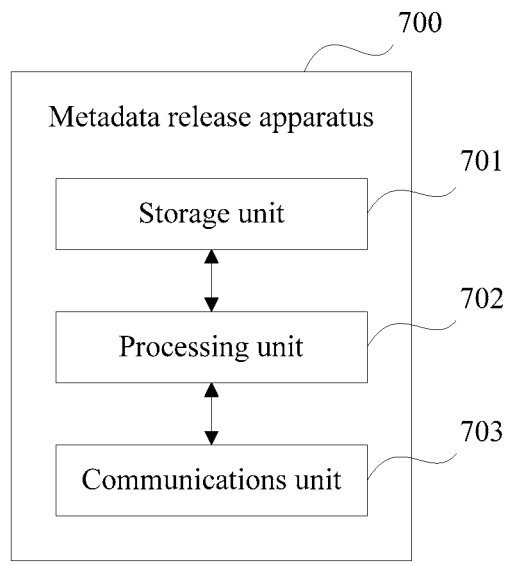
FIG. 7A is a block diagram of functional units of a metadata release apparatus according to an embodiment of the present invention.

When the integrated unit is used, FIG. 7A shows a possible schematic structural diagram of the metadata release apparatus included in the foregoing embodiments.

The metadata release apparatus 700 includes a processing unit 702 and a communications unit 703. The processing unit 702 is configured to control and manage an action of the metadata release apparatus. For example, the processing unit 702 is configured to support the metadata release apparatus to perform steps S301 and S302 in FIG. 3, and/or is configured to perform another process of the technologies described in this specification. The communications unit 703 is configured to support communication between the metadata release apparatus and an NFV system, for example, communication between the metadata release apparatus and an NFVO in the NFV system. The metadata release apparatus may further include a storage unit 701, configured to store program code and data of the metadata release apparatus.

The processing unit 702 may be a processor or a controller. For example, the processing unit 702 may be a central processing unit (CPU), a general-purpose processor, a digital signal processor (DSP), an application-specific integrated circuit (ASIC), a field programmable gate array (FPGA) or another programmable logic device, a transistor logic device, a hardware device, or any combination thereof. The processing unit 702 may implement or execute the logical block diagrams, modules, and circuits of the examples described in combination with the content disclosed in the present invention. The processor may alternatively be a combination that implements a computing function. For example, the processor may include a combination of one or more microprocessors, or a combination of a DSP and a microprocessor. The communications unit 703 may be a communications interface, a transceiver, a transceiver circuit, or the like. The communications interface is a collective name, and may include one or more interfaces. The storage unit 701 may be a memory.

Figure 7B:
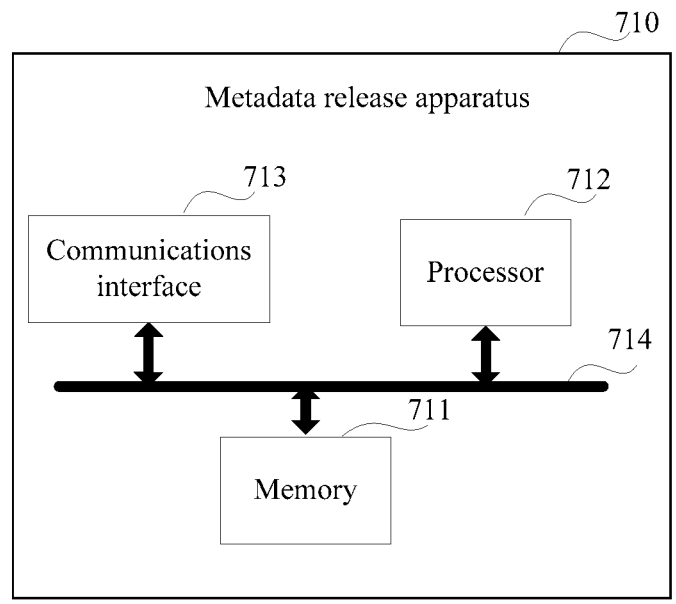
FIG. 7B is a schematic structural diagram of a metadata release apparatus according to an embodiment of the present invention.

When the processing unit 702 is a processor, the communications unit 703 is a communications interface, and the storage unit 701 is a memory, the metadata release apparatus included in the embodiments of the present invention may be a metadata release apparatus shown in FIG. 7B.

Referring to FIG. 7B, the metadata release apparatus 710 includes a processor 712, a communications interface 713, and a memory 711. Optionally, the metadata release apparatus 710 may further include a bus 714. The communications interface 713, the processor 712, and the memory 711 may be connected to each other by using the bus 714. The bus 714 may be a Peripheral Component Interconnect (Peripheral Component Interconnect, PCI for short) bus, an extended industry standard architecture (Extended Industry Standard Architecture, EISA for short) bus, or the like. The bus 714 may be classified into an address bus, a data bus, a control bus, and the like. For ease of representation, the bus 714 is represented by using only one bold line in FIG. 7B. However, it does not mean that there is only one bus or one type of bus.

The metadata release apparatus shown in FIG. 7A or FIG. 7B may also be understood as an apparatus used in a metadata release apparatus. This is not limited in the embodiments of the present invention.

An embodiment of the present invention further provides a computer storage medium. The computer storage medium may store a program. When the program runs, some or all of the steps of any software modification initiation method recorded in the foregoing method embodiments are included.

An embodiment of the present invention further provides a computer storage medium. The computer storage medium may store a program. When the program runs, some or all of the steps of any metadata release method recorded in the foregoing method embodiments are included.

In addition, for ease of description, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention. In the foregoing embodiments, the description of each embodiment has respective focuses. For a part that is not described in detail in an embodiment, reference may be made to related descriptions in other embodiments.

In the several embodiments provided in the present invention, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical or other forms. The units described as separate parts may or may not be physically separated, and parts shown as units may or may not be physical units, may be located in one position, or may be distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit. When the integrated unit is implemented in the form of a software functional unit and sold or used as an independent product, the integrated unit may be stored in a computer readable memory. Based on such an understanding, the technical solutions of the present invention essentially, or the part contributing to the prior art, or all or some of the technical solutions may be implemented in a form of a software product. The computer software product is stored in a memory and includes several instructions for instructing a computer device (which may be a personal computer, a server, a network device, or the like) to perform all or some of the steps of the methods described in the embodiments of the present invention. The foregoing memory includes: any medium that can store program code, such as a USB flash drive, a read-only memory (ROM), a random access memory (RAM), a removable hard disk, a magnetic disk, or an optical disc.

The embodiments of the present invention are described in detail above. The principle and implementations of the present invention are described in this specification by using specific examples. The descriptions about the embodiments are merely provided to help understand the methods and core ideas of the present invention. In addition, a person of ordinary skill in the art can make variations to the specific implementations and application scope according to the ideas of the present invention. Therefore, the content of this specification shall not be construed as a limitation to the present invention.

What is claimed is:

1. A software modification initiation method, wherein the method is applied to a network functions virtualization (NFV) system, the NFV system comprises a virtualized network function manager (VNFM), and the method comprises:
   receiving, by the VNFM, a virtualized network function (VNF) lifecycle management (LCM) request, wherein the VNF LCM request comprises an instance identifier of a VNF instance of to-be-modified first-version VNF software;
   determining, by the VNFM, that a type of the VNF LCM request is a software modification operation, and obtaining metadata according to the VNF LCM request, wherein the metadata comprises a version identifier of the first-version VNF software and a software modification type;
   determining, by the VNFM, a first VNF instance of the first-version VNF software based on the version identifier of the first-version VNF software and the instance identifier of the VNF instance of the first-version VNF software; and
   initiating, by the VNFM, a software modification operation for the first VNF instance of the first-version VNF software based on the software modification type; and, wherein
   the software modification type in the metadata indicates a VNF software upgrade; and
   initiating, by the VNFM, the software modification operation for the first VNF instance of the first-version VNF software based on the software modification type comprises:
   obtaining a file name and an access address of a target executable file that is used for an update to a second VNF instance of the second-version VNF software, and a mapping relationship between an executable file and a software image, wherein the file name, the access address, and the mapping relationship are in the metadata, and an instance identifier of the first VNF instance is consistent with an instance identifier of the second VNF instance;
   obtaining the target executable file based on the access address and the file name;
   determining, based on the mapping relationship between an executable file and a software image, a software image corresponding to the target executable file;
   determining, based on the software image, a virtual machine corresponding to a to-be-updated virtualized network function component (VNFC) instance in the first VNF instance; and
   sending a software update request by using the communications unit, wherein the software update request is used to instruct the virtual machine to run the executable file to update the VNFC instance.

2. The method according to claim 1, wherein the NFV system comprises a network functions virtualization orchestrator (NFVO), and receiving, by the VNFM, the virtualized network function (VNF) lifecycle management (LCM) request comprises:
   receiving, by the VNFM, the VNF LCM request sent by the NFVO.

3. The method according to claim 1, wherein the NFV system runs the first VNF instance, wherein the first VNF instance is obtained by the NFV system by instantiating the first-version VNF software, and wherein initiating, by the VNFM, the software modification operation for the first VNF instance of the first-version VNF software based on the software modification type comprises:
   initiating, by the VNFM in a running process of the first VNF instance, the software modification operation for the first VNF instance of the first-version VNF software based on the software modification type.

4. The method according to claim 1, wherein the metadata further comprises a mapping relationship between a software upgrade policy and a resource option, wherein the deployment option comprises a resource option and a connection option, and wherein obtaining, by the VNFM, the deployment option used to instantiate second-version VNF software into the second VNF instance comprises:
   obtaining, by the VNFM, a target software upgrade policy in the VNF LCM request, wherein the target software upgrade policy is used for the upgrade to the second VNF instance of the second-version VNF software;
   determining, by the VNFM based on the mapping relationship between a software upgrade policy and a resource option that is in the metadata, a resource option corresponding to the target software upgrade policy; and
   determining, by the VNFM, a connection option corresponding to the resource option.

5. The method according to claim 1, wherein obtaining, by the VNFM, the deployment option for instantiating the second-version VNF software into the second VNF instance comprises:
   obtaining, by the VNFM, the deployment option, in the VNF LCM request, wherein the the deployment option is configured for instantiating the second-version VNF software into the second VNF instance.

6. The method according to claim 1, wherein the software modification type in the metadata indicates a VNF software update.

7. The method according to claim 6, wherein initiating, by the VNFM, the software modification operation for the first VNF instance of the first-version VNF software based on the software modification type comprises:
   obtaining, by the VNFM, a file name and an access address of a target executable file that is used for an update to a second VNF instance of a second-version VNF software, and a mapping relationship between the executable file and a software image, wherein the file name, the access address, and the mapping relationship are in the metadata, and an instance identifier of the first VNF instance is consistent with an instance identifier of the second VNF instance;
   obtaining, by the VNFM, the target executable file based on the access address and the file name;
   determining, by the VNFM based on the mapping relationship between an executable file and a software image, a software image corresponding to the target executable file;
   determining, by the VNFM based on the software image, a virtual machine corresponding to a to-be-updated virtualized network function component VNFC instance in the first VNF instance; and sending, by the VNFM, a software update request, wherein the software update request is configured to instruct the virtual machine to run the target executable file to update the VNFC instance.

8. The method according to claim 1, wherein the software modification type in the metadata indicates a virtualized network function component (VNFC) software upgrade, and the to-be-modified first-version VNF software comprises first VNFC software;

the NFV system runs a first VNFC instance, the first VNFC instance is obtained by the NFV system by instantiating the first VNFC software, the metadata further comprises an image identifier, for upgrading the first VNFC software, of a software image of second VNFC software, and the NFV system further comprises an element manager (EM) and a virtualized network function operation and maintenance (VNF O&M) device; and, wherein initiating, by the VNFM, the software modification operation for the first VNF instance of the first-version VNF software based on the software modification type comprises:

determining, by the VNFM, that the software modification type in the metadata is the VNFC software upgrade, and determining an instance identifier of the first VNFC instance based on an instance identifier of the first VNF instance;

instantiating, by the VNFM, the second VNFC software into a second VNFC instance based on the instance identifier of the first VNFC instance and the image identifier of the software image of the second VNFC software; and sending, by the VNFM, a software upgrade request to the EM or the VNF O&M device, wherein the software upgrade request is configured to instruct the EM or the VNF O&M device to upgrade the first VNFC instance to the second VNFC instance.

9. The method according to claim 8, wherein determining, by the VNFM, an instance identifier of the first VNFC instance based on the instance identifier of the first VNF instance comprises:

determining, by the VNFM, an image identifier of a software image of the first VNFC software in the first-version VNF software based on the instance identifier of the first VNF instance; and determining, by the VNFM, the instance identifier of the first VNFC instance based on the image identifier of the software image of the first VNFC software; and, wherein instantiating, by the VNFM, the second VNFC software into the second VNFC instance based on the instance identifier of the first VNFC instance and the image identifier of the software image of the second VNFC software comprises:

applying, by the VNFM, for a resource based on the instance identifier of the first VNFC instance; and instantiating, by the VNFM, the second VNFC software into the second VNFC instance based on the resource obtained by application and the image identifier of the software image of the second VNFC software.

10. The method according to claim 9, wherein the VNF LCM request comprises an identifier of a software package and a target software upgrade policy, wherein the software package comprises the metadata and a VNF descriptor VNFD, and the metadata further comprises an image identifier of a software image of VNFC software and a version identifier of VNF software to which the VNFC software corresponding to the software image belongs; and, wherein determining, by the VNFM, the image identifier of a software image of the first VNFC software in the first-version VNF software based on the instance identifier of the first VNF instance comprises:

determining, by the VNFM, the image identifier of the software image of the first VNFC software in the first-version VNF software based on the instance identifier of the first VNF instance, the image identifier of the software image of the VNFC software, and the version identifier of the VNF software to which the VNFC software corresponding to the software image belongs; and applying, by the VNFM, for the resource based on the instance identifier of the first VNFC instance comprises:

determining, by the VNFM, a resource option and a connection option based on the instance identifier of the first VNFC instance, the VNFD, and the target software upgrade policy, and applying for a deployment option based on the resource option, the connection option, and the image identifier of the software image of the second VNFC software.

11. A virtualized network function manager (VNFM), applied to a network functions virtualization (NFV) system, and comprising a processing unit and a communications unit, wherein the processing unit is configured to:

receive a virtualized network function (VNF) lifecycle management (LCM) request by using the communications unit, wherein the VNF LCM request comprises an instance identifier of a VNF instance of to-be-modified first-version VNF software;

determine that a type of the VNF LCM request is a software modification operation, and obtain metadata according to the VNF LCM request, wherein the metadata comprises a version identifier of the first-version VNF software and a software modification type;

determine a first VNF instance of the first-version VNF software based on the version identifier of the first-version VNF software and the instance identifier of the VNF instance of the to-be-modified first-version VNF software; and initiate a software modification operation for the first VNF instance of the first-version VNF software based on the software modification type; and, wherein the software modification type in the metadata indicates a VNF software upgrade; and the NFV system further comprises an element manager (EM) and a virtualized network function operation and maintenance (VNF O&M) device, and wherein initiating, by the VNFM, the software modification operation for the first VNF instance of the first-version VNF software based on the software modification type comprises:

obtaining, by the VNFM, a deployment option for instantiating a second-version VNF software into a second VNF instance;

instantiating, by the VNFM, the second-version VNF software into the second VNF instance based on the deployment option; and sending, by the VNFM, a software upgrade request to the EM or the VNF O&M device, wherein the software upgrade request is configured to instruct the EM or the VNF O&M device to upgrade the first VNF instance of the first-version VNF software to the second VNF instance of the second-version VNF software.

12. The VNFM according to claim 11, wherein the NFV system comprises a network functions virtualization orchestrator (NFVO), and wherein receiving the VNF LCM request by using the communications unit comprises receiving, by using the communications unit, the VNF LCM request sent by the NFVO.

13. The VNFM according to claim 11, wherein the NFV system runs the first VNF instance, the first VNF instance is obtained by the NFV system by instantiating the first-version VNF software, and wherein initiating the software modification operation for the first VNF instance of the first-version VNF software based on the software modification type comprises: in a running process of the first VNF instance, initiating the software modification operation for the first VNF instance of the first-version VNF software based on the software modification type.

14. The VNFM according to claim 11, wherein the software modification type in the metadata is a VNF software upgrade;
the NFV system further comprises an element manager (EM) and a virtualized network function operation and maintenance (VNF O&M) device, and wherein initiating the software modification operation for the first VNF instance of the first-version VNF software based on the software modification type comprises:
obtaining, by using the communications unit, a deployment option used to instantiate second-version VNF software into a second VNF instance;
instantiating the second-version VNF software into the second VNF instance based on the deployment option; and
sending, by using the communications unit, a software upgrade request to the EM or the VNF O&M device, wherein the software upgrade request is configured to instruct the EM or the VNF O&M device to upgrade the first VNF instance of the first-version VNF software to the second VNF instance of the second-version VNF software.

15. The VNFM according to claim 14, wherein the metadata further comprises a mapping relationship between a software upgrade policy and a resource option, the deployment option comprises a resource option and a connection option, and wherein obtaining, by using the communications unit, the deployment option used to instantiate second-version VNF software into the second VNF instance comprises:
obtaining, by using the communications unit, a target software upgrade policy in the VNF LCM request, wherein the target software upgrade policy is used for the upgrade to the second VNF instance of the second-version VNF software;
determining, based on the mapping relationship between a software upgrade policy and a resource option that is in the metadata, a resource option corresponding to the target software upgrade policy; and
determining a connection option corresponding to the resource option.

16. The VNFM according to claim 14, wherein obtaining, by using the communications unit, the deployment option used to instantiate second-version VNF software into the second VNF instance comprises: obtaining, by using the communications unit, the deployment option, in the VNF LCM request, wherein the deployment option is configured for instantiating the second-version VNF software into the second VNF instance.

17. The VNFM according to claim 11, wherein the software modification type in the metadata is a virtualized network function component (VNFC) software upgrade, and the to-be-modified first-version VNF software comprises first VNFC software.

18. The VNFM according to claim 17, wherein the NFV system runs a first VNFC instance, the first VNFC instance is obtained by the NFV system by instantiating the first VNFC software, the metadata further comprises an image identifier, used to upgrade the first VNFC software, of a software image of second VNFC software, and the NFV system further comprises an element manager EM and a virtualized network function operation and maintenance VNF O&M device; and
wherein initiating the software modification operation for the first VNF instance of the first-version VNF software based on the software modification type comprises:
determining that the software modification type in the metadata is the VNFC software upgrade, and determining an instance identifier of the first VNFC instance based on an instance identifier of the first VNF instance;
instantiating the second VNFC software into a second VNFC instance based on the instance identifier of the first VNFC instance and the image identifier of the software image of the second VNFC software; and
sending, by using the communications unit, a software upgrade request to the EM or the VNF O&M device, wherein the software upgrade request is used to instruct the EM or the VNF O&M device to upgrade the first VNFC instance to the second VNFC instance.

19. The VNFM according to claim 18, wherein determining the instance identifier of the first VNFC instance based on an instance identifier of the first VNF instance comprises
determining an image identifier of a software image of the first VNFC software in the first-version VNF software based on the instance identifier of the first VNF instance; and
determining the instance identifier of the first VNFC instance based on the image identifier of the software image of the first VNFC software; and, wherein
instantiating the second VNFC software into the second VNFC instance based on the instance identifier of the first VNFC instance and the image identifier of the software image of the second VNFC software comprises:
applying for a resource based on the instance identifier of the first VNFC instance; and
instantiating the second VNFC software into the second VNFC instance based on the resource obtained by application and the image identifier of the software image of the second VNFC software.

20. The VNFM according to claim 19, wherein the VNF LCM request comprises an identifier of a software package and a target software upgrade policy, the software package comprises the metadata and a VNF descriptor VNFD, and the metadata further comprises an image identifier of a software image of VNFC software and a version identifier of VNF software to which the VNFC software corresponding to the software image belongs; and, wherein
determining the image identifier of the software image of the first VNFC software in the first-version VNF software based on the instance identifier of the first VNF instance comprises determining the image identifier of the software image of the first VNFC software in the first-version VNF software based on the instance identifier of the first VNF instance, the image identifier of the software image of the VNFC software, and the version identifier of the VNF software to which the VNFC software corresponding to the software image belongs; and applying for a resource based on the instance identifier of the first VNFC instance comprises: determining a resource option and a connection option based on the instance identifier of the first VNFC instance, the VNFD, and the target software upgrade policy; and apply for a deployment option based on the resource option, the connection option, and the image identifier of the software image of the second VNFC software.

* * * * *